United States Patent
Hisatake

[19]

[11] Patent Number: 6,065,036
[45] Date of Patent: May 16, 2000

[54] IMAGE METHOD AND APPARATUS FOR PROCESSING MULTIPLE JOBS

[75] Inventor: Masayuki Hisatake, Ebina, Japan

[73] Assignee: Fuji Xerox Co., Ltd., Tokyo, Japan

[21] Appl. No.: 08/698,310

[22] Filed: Aug. 15, 1996

[30]    Foreign Application Priority Data

Aug. 25, 1995  [JP]  Japan ..................... 7-217976

[51] Int. Cl.⁷ ............................................. G06F 9/00
[52] U.S. Cl. .................................. 709/100; 709/103
[58] Field of Search ......................... 395/670, 671, 395/672, 673, 675; 709/100, 101, 102, 103, 104, 105

[56]             References Cited

U.S. PATENT DOCUMENTS

| | | |
|---|---|---|
| 5,177,625 | 1/1993 | Nakashima et al. . |
| 5,394,547 | 2/1995 | Correnti et al. . |
| 5,642,508 | 6/1997 | Miyazawa .............................. 395/674 |
| 5,710,921 | 1/1998 | Hirose . |
| 5,774,718 | 6/1998 | Aoshima et al. ....................... 395/670 |

FOREIGN PATENT DOCUMENTS

| | | |
|---|---|---|
| 5-130311 | 5/1993 | Japan . |
| 5-136934 | 6/1993 | Japan . |
| 5-328066 | 12/1993 | Japan . |

OTHER PUBLICATIONS

Andrew S. Tanenbaum, "Modern Operating Systems", Prentice Hall, Inc. A Simon & Schuster Company, pp. 67–68, 1992.

*Primary Examiner*—Majid A. Banankhah
*Attorney, Agent, or Firm*—Oliff & Berridge, PLC

[57]              ABSTRACT

An image processing device includes process means for executing a plurality of jobs each consisting of a given preprocessing and a postprocessing to be executed after execution of the preprocessing; processing amount recognize means for recognizing processing amounts in the preprocessings of the respective jobs; and order decide means, in accordance with the respective processing amounts recognized, for deciding the order to execute the preprocessings or the postprocessings of the jobs.

19 Claims, 12 Drawing Sheets

| RECEIVE NO. | FUNCTION | PREPROCESSING TIME | OUTPUT PROCESSING ORDER | NUMBER OF INTERRUPTS |
|---|---|---|---|---|
| 1 | FACSIMILE | 1.2 | 1 | 0 |
| 2 | COPY | 10.0 | 2 | 0 |
| 3 | PRINT | 61.5 | 3 | 0 |
| 4 | PRINT | 157.2 | 4 | 0 |

| RECEIVE NO. | FUNCTION | PREPROCESSING TIME | OUTPUT PROCESSING ORDER | NUMBER OF INTERRUPTS |
|---|---|---|---|---|
| 1 | FACSIMILE | 1.2 | 1 | 0 |
| 2 | COPY | 10.0 | 3* | 1 |
| 3 | PRINT | 61.5 | 4* | 1 |
| 4 | PRINT | 157.2 | 5* | 1 |
| 5 | COPY | 5.1 | 2 | 0 |

FIG. 7

| RECEIVE NO. | FUNCTION | PROCESSING CONDITION ||||||| OUTPUT PROCESSING AMOUNT | STATE |
| --- | --- | --- | --- | --- | --- | --- | --- | --- | --- |
| | | SHEET SIZE | PAGE NO. | COPY NO. | PREPROCESSING TIME | PROCESSING RATIO | ... | | |
| 1 | COPY | A4 HORIZONTAL | 5 | 3 | 5.0 | 6 | ... | 14 | UNDER PROCESSING |
| 2 | PRINT | A3 | 20 | 5 | 31.0 | 1 | ... | 4 | UNDER PROCESSING |
| 3 | COPY | A4 VERTICAL | 10 | 3 | 14.0 | 2 | ... | 2 | UNDER PROCESSING |
| 4 | FAX | A4 VERTICAL | 10 | 1 | 1.8 | ... | ... | 0 | UNPROCESSED |
| ... | ... | ... | ... | ... | ... | ... | ... | ... | ... |

IMAGE METHOD AND APPARATUS FOR PROCESSING MULTIPLE JOBS

BACKGROUND OF THE INVENTION

1. Field of the Invention

The present invention relates to an image processing device which is suitable for use in a combined machine capable of performing the functions of a copying machine, a printer, a facsimile and the like.

2. Description of the Related Art

Conventionally, there is known a combined machine which can execute by itself the functions of a copying machine, a printer, a facsimile and the like. In such combined machine, in order to improve the productivity of jobs relating to the respective functions, there have been made various proposals as to what order these jobs are executed in, or as to what processing ratios these jobs are processed in parallel at.

For example, in Japanese Patent Publication No. 5-130311 of Heisei, there is disclosed a device which processes the respective functions according to a given priority. Also, in Japanese Patent Publication No. 5-136934 of Heisei, there is disclosed a device which decides a processing order to execute a plurality of competitive functions in accordance with a condition specified by a user. Further, in Japanese Patent Publication No. 5-328066 of Heisei, there is proposed a device which is able to select functions to be operated simultaneously, a priority thereof, or an operation ratio thereof.

However, in the above-mentioned conventional devices, there are still left various problems to be solved as follows:

Firstly, in the technology disclosed in Japanese Patent Publication No. 5-130311 of Heisei, since the priority is fixed, a job having a low priority is deferred for future processing even if it has a slight amount of processing. Secondly, in the technology disclosed in Japanese Patent Publication No. 5-136934 of Heisei, a user is allowed to specify a processing order for execution of a plurality of functions but this requires a complicated operation. Also, if a job having a large amount of processing is started, then the remaining jobs are made to wait for a long time until the present job is ended.

Thirdly, in the technology disclosed in Japanese Patent Publication No. 5-328066 of Heisei, a user is allowed to set freely a processing order or a processing ratio for execution of a plurality of functions owned by a combined machine. Due to this, even if a plurality of jobs compete with each other, the jobs can be processed in parallel while they are switched over to each other. However, this requests the user to carry out a complicated operation. Also, generally, it is difficult for the user to judge what processing ratio is set at or what processing order is set in, in order to be able to process the jobs with the highest efficiency.

SUMMARY OF THE INVENTION

The present invention aims at eliminating the drawbacks found in the above-mentioned conventional devices. Accordingly, it is an object of the invention to provide an image processing device which is able to automatically decide a processing order or a processing ratio for processing of a plurality of jobs in accordance with the processing amounts of these jobs.

In attaining the above object, according to the structure of a first aspect of the invention, there is provided an image processing device which comprises: process means for executing a plurality of jobs each consisting of a given preprocessing and a postprocessing to be executed after execution of the preprocessing; processing amount recognize means for recognizing processing amounts in the preprocessings of the respective jobs; and, order decide means, based on the respective processing amounts recognized, for deciding the order to execute the preprocessings or postprocessings of the respective jobs.

Also, according to the structure of a second aspect of the invention, there is provided an image processing device which comprises: process means for executing a plurality of jobs each consisting of a given preprocessing and a postprocessing to be executed after execution of the preprocessing; processing amount recognize means for recognizing processing amounts in the preprocessings of the respective jobs; processing ratio decide means, based on the respective processing amounts recognized, for deciding the processing ratios of the preprocessings or postprocessings relating to the respective jobs; and, parallel execute means, based on the thus decided processing ratios, for executing the above-mentioned preprocessings or the above-mentioned postprocessings.

Also, according to the structure of a third aspect of the invention, there is provided an image processing device which comprises:

process means for executing a plurality of jobs each consisting of a given preprocessing and a postprocessing to be executed after execution of the preprocessing; processing amount recognize means for recognizing processing amounts in the postprocessings of the respective jobs; and, order decide means, based on the respective processing amounts recognized, for deciding the order to execute the preprocessings or postprocessings of the respective jobs.

Also, according to the structure of a fourth aspect of the invention, there is provided an image processing device which comprises: process means for executing a plurality of jobs each consisting of a given preprocessing and a postprocessing to be executed after execution of the preprocessing; processing amount recognize means for recognizing processing amounts in the postprocessings of the respective jobs; processing ratio decide means, based on the respective processing amounts recognized, for deciding the processing ratios of the preprocessings or postprocessings relating to the respective jobs; and, parallel execute means, based on the thus decided processing ratios, for executing the above-mentioned preprocessings or the above-mentioned postprocessings.

Also, according to the structure of a fifth aspect of the invention, there is provided an image processing device of the first aspect of the invention, which further includes a central processing unit for executing or controlling the above-mentioned preprocessings or the above-mentioned postprocessings and also in which the above-mentioned processing amounts are the processing amounts of the above-mentioned central processing unit.

Also, according to the structure of a sixth aspect of the invention, there is provided an image processing device of the first aspect of the invention, in which the above-mentioned processing amount recognize means recognizes the above-mentioned processing amounts in accordance with the sizes of the data to be processed on the respective jobs.

Also, according to the structure of a seventh aspect of the invention, there is provided an image processing device of the first aspect of the invention, which further includes functional classify means for classifying the above-mentioned jobs according to functions to be processed and also in which the above-mentioned processing amount recognize means estimates the above-mentioned processing amounts according to the jobs classified by the above-mentioned functional classify means.

Also, according to the structure of an eighth aspect of the invention, there is provided an image processing device of the first aspect of the invention, which further includes processing amount measure means for measuring the processing amounts of the preprocessings or postprocessings of the above-mentioned respective jobs and also in which the above-mentioned processing amount recognize means, based on the processing amounts measured by the above-mentioned processing amount measure means, estimates a processing amount relating to a job to be generated next.

Also, according to the structure of a ninth aspect of the invention, there is provided an image processing device of the first aspect of the invention, in which the above-mentioned jobs are jobs for copying a manuscript and the above-mentioned processing amount recognize means detects the size of the above-mentioned manuscript before the contents of the above-mentioned manuscript are read out and, based on the detected result, recognizes the above-mentioned processing amounts.

Further, according to the structure of a tenth aspect of the invention, there is provided an image processing device of the first aspect of the invention, in which the above-mentioned order decide means decides the above-mentioned order in such a manner that a job having a smaller processing amount recognized by the above-mentioned processing amount recognize means can be executed in preference to other jobs.

Moreover, according to the structure of an eleventh aspect of the invention, there is provided an image processing device of the second or fourth aspect of the invention, in which the above-mentioned processing ratio decide means gives a higher processing ratio to a job having a smaller processing amount recognized by the above-mentioned processing amount recognize means.

In addition, according to the structure of a twelfth aspect of the invention, there is provided an image processing device of the first aspect of the invention, in which the above-mentioned postprocessings are image forming processings.

The above and other objects and features of the present invention will be more apparent from the following description taken in conjunction with the accompanying drawings.

BRIEF DESCRIPTION OF THE DRAWINGS

FIG. 7 is an explanatory view of data to be stored in a processing ratio decide part 2b;

DETAILED DESCRIPTION OF THE PREFERRED EMBODIMENTS

Now, a description will be given in more detail of various embodiments of the invention with reference to the accompanying drawings.

A. First Embodiment

A-1. Structure of the Embodiment

Now, description will be given below of a combined machine according to a first embodiment of the invention with reference to FIG. 1. Here, the present combined machine has a copy function, a facsimile function and a printer function in combination.

Figure 1:
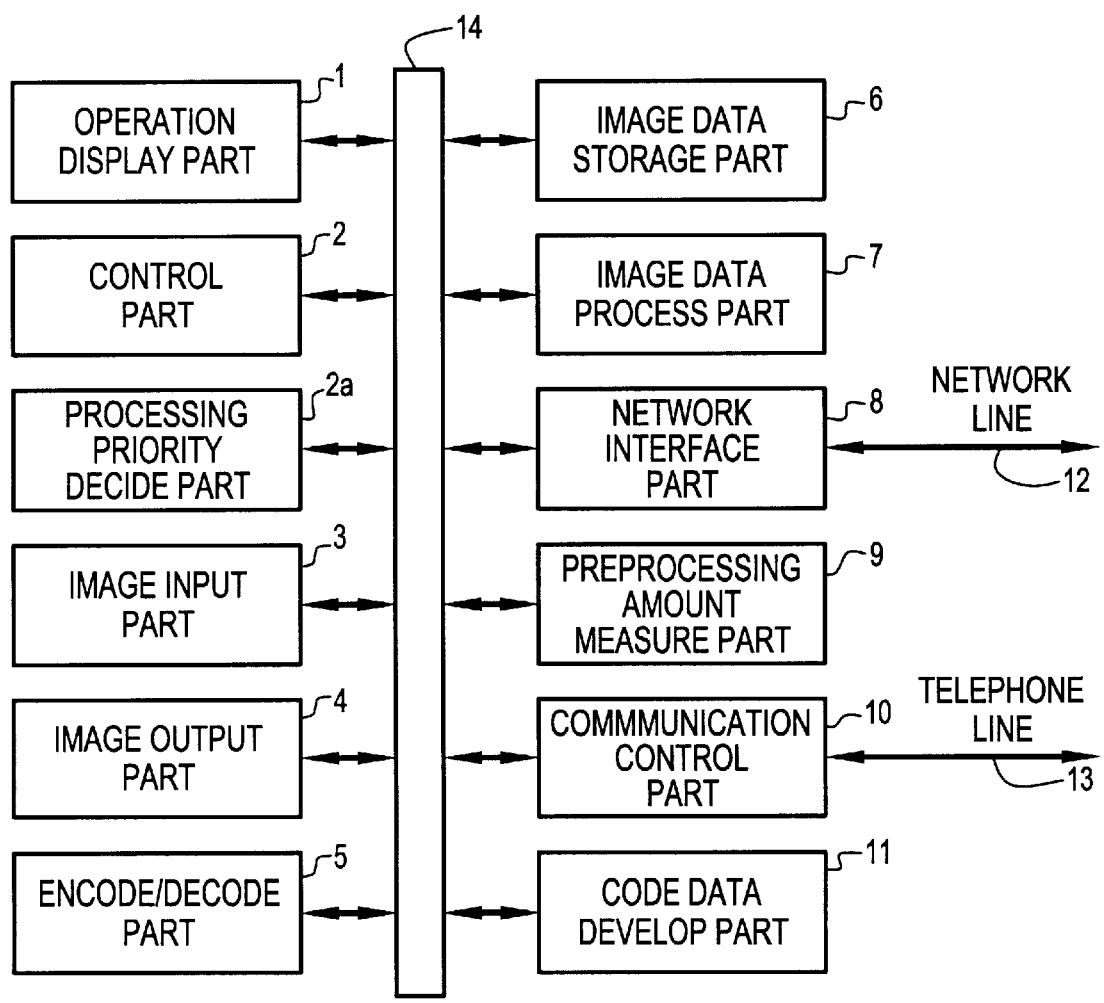
FIG. 1 is a block diagram of the structure of a first embodiment of an image processing device according to the invention.

In FIG. 1, reference character 1 designates an operation display part which is composed of a display, a control panel and the like. A user is allowed to set the details of the respective functions through the control panel. For example, the user can set a copy function such as the number of copies, a copy magnification and the like, as well as a facsimile function such as the destination of transmission, a transmission mode and the like. Also, in the display, there are displayed the contents of the function selected or set, an error message, an operation guide and the like.

Reference character 2 stands for a control part which controls the remaining component elements of the combined machine in accordance with a control program to be discussed later. Also, 2a designates a processing order decide part which decides a processing order or processing ratio for processing of a plurality of jobs in accordance with a processing to be discussed later. 3 stands for an image input part which reads the contents of a manuscript set on a platen glass or an automatic manuscript feed device and outputs the manuscript contents as image data through a bus 14. 4 designates an image output part which outputs the image data supplied thereto through the bus 14 to a recording sheet or the like electrophotographically.

5 stands for an encode/decode part which performs an encoding or decoding processing on the image data supplied and then outputs the encoded or decoded data. An encoding/decoding technique used here is selected according to the functions of the combined machine. For example, when the facsimile function is employed, there is selected an MH technique, an MR technique, an MMR technique or the like which is used in facsimile communication. Also, when the copy function is selected, there is selected a predetermined technique in order to reduce the image storage data amount.

6 designates an image data storage part in which various kinds of image data and the like can be stored. Also, the image data storage part 6 is used as an auxiliary storage device in various processings to be performed in the control part 2. 7 stands for an image data process part which performs a rotation processing, an enlargement processing, a reduction processing, a resolving power conversion processing, and other processings on the image data supplied through the bus 14. 8 designates a network interface part which receives print data (code data) supplied through a network line 12.

9 stands for a preprocessing measure part which includes timers TM1 and TM2 to be started/stopped by a command given from the control part 2, while the preprocessing measure part 9 measures the preprocessing amounts of the respective jobs by means of the timers TM1 and TM2 (the details of the operation of the part 9 will be discussed later). 10 designates a communication control part which transmits and receives facsimile data through a telephone line. 11 stands for a code data develop part which converts the code data described in a given page descriptive language to bit map image data.

A-2. Individual Operations of Respective Functions

At first, prior to description of the synthetic operation of the first embodiment, description will be given here of the individual operations of the respective functions of the first embodiment.

(1) Copy Operation

Preprocessing

When copying a manuscript, a user performs a given operation on the operation display part 1 to thereby set the function of the combined machine to the copy function, sets the number of copies, a copy magnification and the like according to cases, and places the manuscript on the platen glass. After then, the user may press down a given start button.

Figure 5:
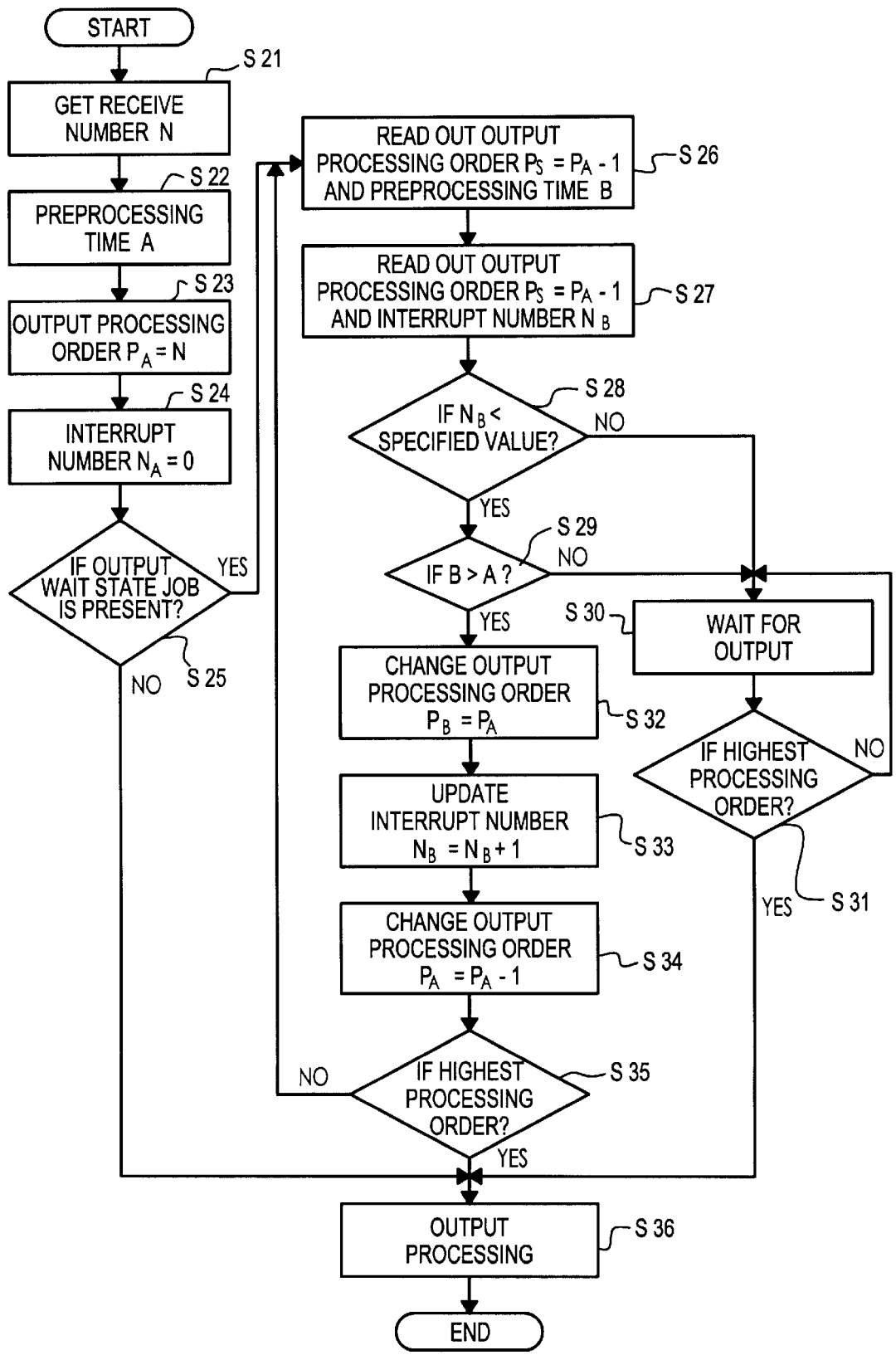
FIG. 5 is a flow chart of a control program employed in the first embodiment.

If the start button is depressed, then a program shown in FIG. 5 is started. Here, the control part 2 in the present embodiment is capable of performing a multitask processing and thus the program shown in FIG. 5 is started by the number of jobs under preprocessing. Due to this, during use of the copy function, it is also possible to carry out a facsimile receiving operation and other operations. Now, in FIG. 5, if the processing advances to Step S21, then a receive number N with respect to the present job (task) is given. The receive numbers are numbers which are given to the respective jobs in the order received by the combined machine, for example, in the order of 1, 2, 3 . . . .

Figure 2:
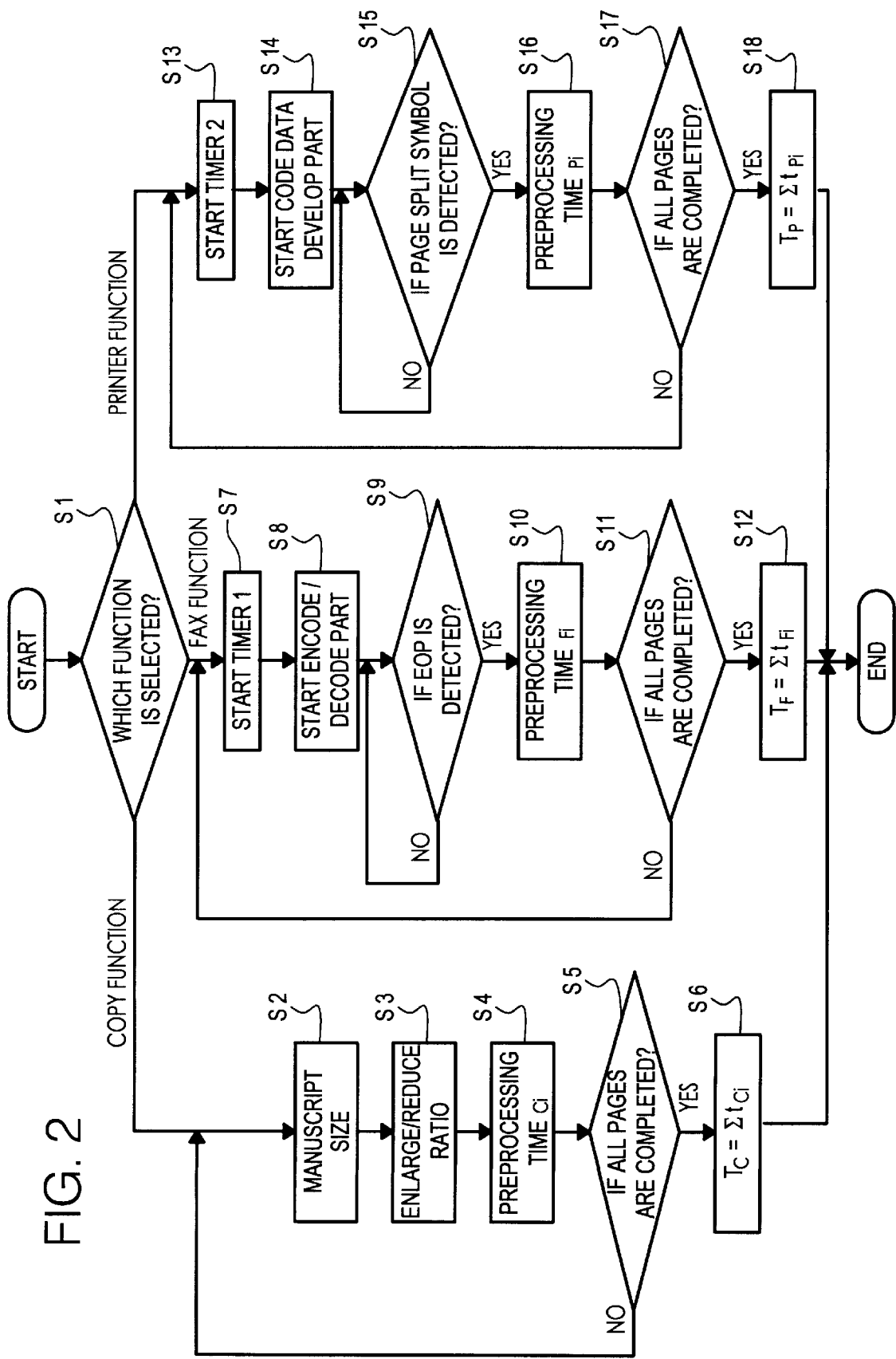
FIG. 2 a flow chart of a control program employed in the first embodiment.

Next, if the processing goes to Step S22, then a subroutine shown in FIG. 2 is started. In FIG. 2, if the processing advances to Step S1, then the processing is branched according to the current function of the combined machine. In the above embodiment, since the copy function is selected, the processing is allowed to go to Step S2. In this step, the size of a manuscript set in the image input part 3 is detected by a well-known manuscript size sensor (not shown) and the detect result thereof is stored as manuscript size information Sz.

Next, if the processing advances to Step S3, then enlarge/reduce information Re previously set in the operation display part 1 is fetched. Then, if the processing goes to Step S4, then a partial preprocessing time $t_{Ci}$ is found in accordance with the manuscript size information Sz and enlarge/reduce information Re. Here, description will be given of the details of this operation. That is, firstly, in the image input part 3 of the present embodiment, a manuscript placed on the platen glass or a manuscript to be fed through an automatic manuscript feed device is optically scanned at a given constant speed, the scan result is sampled by a sampling clock having a constant cycle, and the sampling result is output as image data.

Therefore, if the moving speed of the scanner of the image input part 3 or the feeding speed of the automatic manuscript feed device is increased, then it is possible to obtain such image data in which the manuscript is thinned out in the sub-scan direction thereof. That is, the manuscript is reduced in size in the sub-scan direction. On the other hand, if the above-mentioned speed is decreased, then the manuscript is scanned densely along the sub-scan direction thereof and thus the manuscript is enlarged in size in the sub-scan direction. Accordingly, the approximate value of the time necessary to read the manuscript can be found by the product of the manuscript size information Sz multiplied by the enlarge/reduce information Re. Here, the approximate value provides the partial preprocessing time $t_{Ci}$.

Also, in Step S4, not only the partial preprocessing time $t_{Ci}$ is calculated, but also various commands necessary to read the manuscript are supplied from the control part 2 to the other component elements of the combined machine. Therefore, if the manuscript image data are input from the image input part 3, then the input manuscript image data are supplied to and encoded in the encode/decode part 5. That is, because the image data are converted into the code data, the data amount is compressed. The thus obtained code data are sequentially stored into the image data storage part 6.

Next, if the processing goes to Step S5, then it is checked whether reading of all pages of the manuscript is completed or not. When the manuscript is placed on the platen glass, here, it is always judged [YES]. On the other hand, when the manuscript is set in the automatic manuscript feed device, if the whole manuscript has been fed completely, it is judged [YES]. However, if the manuscript is still left in the automatic manuscript feed device, then it is judged [NO], and the processing is made to go back to Step S2.

After then, the partial preprocessing times $t_{Ci}$ are found with respect to the respective pages of the manuscript, the image data representing the contents of the respective manuscript pages are converted into code data by means of the encode/decode part 5 and are then stored into the image data storage part 6. Now, if the reading of all pages of the manuscript is completed and thus the processing advances to Step S6, then there is calculated a total value (preprocessing time $T_C$) of the partial preprocessing times $t_{Ci}$ of the respective pages. If the foregoing steps are completed, then the processing is allowed to return back to the program shown in FIG. 5.

Postprocessing

After then, in the job relating to the copy function, if the processing advances to Step S36, then the code data stored in the image data storage part 6 are read out sequentially in accordance with the condition previously set by the operation display part 1 and are then supplied to the encode/decode part 5. Here, in the present job, a timing at which the processing advances to Step S36 is decided according to a relationship between the present job and the other jobs (the details of the timing decision operation will be discussed later). Now, the code data supplied to the encode/decode part 5 are decompressed and decoded to the image data, and are then supplied to the image output part 4. As a result of this, the image data can be output to a recording sheet.

In the above operation, there can occur a case in which the direction of the image data read in by the image input part 3 does not agree with the direction of the recording sheet selected by the operation display part 1, or, a case in which a recording sheet tray corresponding to recording sheets arranged in a desired direction is empty. In such case, the image data output from the encode/decode part 5 are supplied to the image data process part 7. Responsive to this, in the image data process part 7, a rotation processing is performed on the image data according to the directions of usable recording sheets and the results thereof are then supplied to the image output part 4. This makes it possible to continue the outputting of the image data to the recording sheets.

(2) Facsimile Transmission

When transmitting the image data to the other facsimile, the user sets a transmission manuscript in the image input part 3 and allows the operation display part 1 to issue a command for facsimile transmission. In accordance with this command, the image data on the transmission manuscript are input from the image input part 3 and are then supplied to the encode/decode part 5. In the encode/decode part 5, the image data are converted into code data and the thus obtained code data are then stored into the image data storage part 6. In this manner, if the storage of the code data is completed, then a message to the effect that the storage of the code data is completed is displayed on the display of the operation display part 1.

Next, the user allows the operation display part 1 to specify the number of the other facsimile, a transmission mode and the like. When these are specified, the other station is called up by the communication control part 10 through the telephone line 13, so that a call is determined. Next, if information as to the class of the other facsimile and the like is supplied to the communication control part 10 through the telephone line 13, then the control part 2 checks whether the code data previously stored in the image data storage part 6 can fit in with the resolving power of the other facsimile or not. Here, if they are found fittable, then the stored code data are supplied sequentially to the communication control part 10. The thus supplied code data are modem modulated and are then transmitted through the telephone line 13.

On the other hand, in the control part 2, if they are found unfittable, then the code data are supplied to the image data process part 7. Due to this, the code data are converted into code data which can fit in with the other facsimile and the receive mode thereof and, after then, they are supplied to the communication control part 10. In the communication control part 10, the code data are modem modulated as described above and the thus modulated data or signals are then transmitted through the telephone line 13. If the facsimile transmission is completed, then the call is cleared by the communication control part 10.

(3) Facsimile Reception

Preprocessing

Also, when a call is issued from the other facsimile through the telephone line 13, then an interrupt is generated by the communication control part 10 and, in the control part 2, the function of the combined machine is set to the facsimile function and the program shown in FIG. 5 is started. As a result of this, in Step S21, a receive number N is given and, in Step S22, the subroutine shown in FIG. 2 is started again. In this case, the processing advances to Step S7 through Step S1. In Step S7, the timer TM1 provided within the preprocessing measure part 9 is started to measure the time that elapses after the subroutine is started.

Next, if the processing advances to Step S8, then the encode/decode part 5 is started and the processing goes to Step S9. On the other hand, the communication control part 10 receives the modem modulated code data from the telephone line 13 and modem demodulates the received code data. The code data obtained as the results of the demodulation are stored in the image data storage part 6. Also, the present code data are supplied sequentially to the control part 2.

Now, in Step S9, the processing waits until the above-mentioned code data are supplied to the control part 2 and, if the code data are supplied to the control part 2, then it is checked whether the code data are a page terminal code EOP or not. Here, the page terminal code EOP means an RTC code (a control return code applied in a G3 machine), an EOFB code (a facsimile block terminal code applied in a G4 machine) and other similar codes which point out the termination of a page. If the code data are other than the page terminal code EOP, then it is judged [NO]. That is, the processing is made to wait until the next code data are supplied and the processing of Step S9 is performed repeatedly.

On the other hand, when the page terminal code EOP is supplied, it is judged [YES] and thus the processing is allowed to advance to Step S10. Here, the timer TM1 is stopped and the time measured result thereof, that is, the time elapsed from the execution of Step S7 to the advancement to Step S10 (partial preprocessing time $t_{Fi}$) is read out from the timer TM1. Next, if the processing goes to Step S11, then it is checked whether reception of the code data of all pages is completed or not. If the reception is not yet completed, then it is found [NO] and thus the processing is made to return back to Step S7.

After then, until the facsimile reception is completed, processings similar to the above-mentioned processings are carried out repeatedly. That is, for each page of the received data of the facsimile, the partial preprocessing time $t_{Fi}$ is measured. If reception of the code data of all pages is completed, then the processing is allowed to advance to Step S12, in which there is found a total value (preprocessing time $T_F$) of the partial preprocessing times $t_{F1}$ of the respective pages. On completion of the foregoing steps, the processing returns back to the program shown in FIG. 5.

Postprocessing

After then, in a job relating to the present facsimile function, if the processing goes to Step S36, then the code data stored in the image data storage part 6 are read out therefrom. The read-out code data are supplied sequentially to the encode/decode part 5, in which the code data are decompressed and converted to the image data. In this operation, in the control part 2, it is checked in accordance with the transmission mode of the other facsimile whether the converted image data have a resolving power which fits in with the image output part 4.

Here, when the image data have a resolving power fitting in with the image output part 4, then the image data are supplied sequentially to the image output part 4 and are then output through a recording sheet. On the other hand, when the image data do not have a resolving power fitting in with the image output part 4, then the image data are supplied to the image data process part 7, in which they are converted to image data having a resolving power fitting in with the image output part 4. The thus converted image data are then output through the image output part 4.

Also, similarly to the copy operation, when a recording sheet tray fitting in with the received (or converted) image data is empty, then a rotation processing is performed on the image data by the image data process part 7. That is, the image data are rotated according to the direction of a usable recording sheet and the results of the rotation processing are then supplied to the image output part 4. Due to this, image output to the recording sheet can be continued on.

(4) Print Operation

Preprocessing

If code data in the form of a page descriptive language (PDL) are supplied through the network line 12, then the code data are received by the network interface part 8. As a result of this, an interrupt is generated by the network interface part 8 and, in the control part 2, the function of the combined machine is set to the printer function. In this case as well, the program shown in FIG. 5 is started, a receive number N is given to a job relating to the printer function (Step S21) and, in Step S22, the subroutine shown in FIG. 2 is started again.

In this case, the processing advances through Step S1 to Step S13. In this step, the timer TM2 incorporated in the preprocessing measure part 9 is started to measure the time that elapses after the processing of Step S13 is executed. Next, if the processing advances to Step S14, then the code data develop part 11 and encode/decode part 5 are started and the processing then advances to Step S15. On the other hand, the network interface part 8 continues to receive the code data through the network line 12 and supplies them to the code data develop part 11.

In the code data develop part 11, the received code data are converted to bit map image data. The bit map image data are sequentially supplied to the encode/decode part 5 and are then converted to compressed code data. The thus obtained code data are sequentially stored into the image data storage part 6. Also, the network interface part 8 supplies the code data to the control part 2 sequentially.

Now, in Step S15, the processing waits until the above-mentioned code data are supplied to the control part 2 and, if the code data are supplied to the control part 2, then it is checked whether the code data are a given page split symbol or not. If the code data are other than the page split symbol, then it is judged [NO], the processing is made to wait until the next code data are supplied, and the processing of Step S15 is executed repeatedly.

On the other hand, if the page split symbol is supplied as the code data, then it is judged [YES] and thus the processing is allowed to go to Step S16. In this step, the timer TM2 is stopped and the measured result thereof, that is, the time (partial preprocessing time $t_{pi}$) that has elapsed from the execution of the processing of Step S13 to the advancement of the processing to Step S16 is read out from the timer TM2. Next, if the processing goes to Step S17, then it is checked whether reception of the code data of all pages is completed or not. If not yet completed, then it is judged [NO] and the processing is made to go back to Step S13.

After then, until the reception of the code data is completed, processings similar to the above-mentioned processings are carried out repeatedly. That is, each time the page split symbol is detected, the partial preprocessing time $t_{pi}$ is measured. On completion of the reception of the code data of all pages, the processing advances to Step S18, in which there is calculated a total value (preprocessing time $T_P$) of the partial preprocessing times $t_{pi}$ of the respective pages. When the foregoing steps are completed, then the processing is allowed to go back to the program shown in FIG. 5.

Postprocessing

After then, in the job relating to the printer function, if the processing advances to Step S36, then the code data stored in the image data storage part 6 are read out therefrom. The read-out code data are decompressed into the bit map image data by the encode/decode part 5 and are then output through the image output part 4.

A-3. Synthetic Operation of the Present Embodiment (1) Generation of First Job

Next, description will be given of an example of the operation of the present embodiment when a plurality of jobs compete with one another. When a job being processed is not present in the combined machine, if a call is issued from the other facsimile through the telephone line 13, as described above, an interrupt is then generated by the communication control part 10 and, in the control part 2, the function of the combined machine is set to the facsimile function and the program shown in FIG. 5 is started. If the processing advances to Step S21, then a receive number N=1 is given to the job relating to the present facsimile function.

Next, if the processing advances to Step S22, as described above, the subroutine shown in FIG. 2 is called, the preprocessings (Steps S7–S12) relating to the facsimile function are executed, and a preprocessing time $T_F$ is found. When the processing returns back to the subroutine shown in FIG. 5, the calculated preprocessing time $T_C$, $T_F$, or $T_P$ is substituted for a variable A which represents a preprocessing time. Here, it is assumed that the preprocessing time A was [1. 2]. Next, if the processing goes to Step S23, then the value of the receive number N (in the above example, [1]) is substituted for a variable $P_A$ which represents the output processing priority of the present job.

Next, if the processing advances to Step S24, then [0] is substituted for an interrupt number $N_A$. Here, the term [interrupt] in the interrupt number $N_A$ differs from a term [interrupt] which is generally used in the field of information processing. That is, the interrupt number $N_A$ represents the number of other jobs which respectively have a larger receive number N than that of the present job (namely, the time received is later than the present job) but have a higher output processing priority (namely, the output processing thereof is executed prior to the present job).

Next, if the processing goes to Step S25, then it is checked whether a job waiting for output (including a job being output) is present or not. Here, since it is assumed that a job being processed is not present in the combined machine before the present job is generated, it is judged [NO] and the processing advances to Step S36. Due to this, as described above, a postprocessing (output processing) relating to the facsimile function is started. By the way, the preprocessing time A, output processing priority $P_A$ and interrupt number $N_A$ are respectively stored in the given areas of a memory provided in the processing priority decide part 2a. These areas provide common areas for the respective tasks and the values thereof can be referred to and can be changed by other tasks.

(2) Generation of Second Job

While the output processing relating to the facsimile function is being executed, if the user presses down the start button of the operation display part 1, then the program shown in FIG. 5 is started in another task. In FIG. 5, if the processing advances to Step S21, then [receive number N=2] is given to a job relating to the present copy function.

Next, if the processing advances to Step S22, as described above, the subroutine shown in FIG. 2 is then called, a preprocessing (Steps S2–S6) relating to the copy function is executed, and a preprocessing time $T_C$ is found. When the processing returns back to the subroutine shown in FIG. 5, the thus found preprocessing time $T_C$ is substituted for the variable A. Here, it is assumed that the preprocessing time A was [10. 0]. Next, if the processing goes to Step S23, then the value (in the above-mentioned case, [2]) of the receive number N is substituted for a variable $P_A$ representing the output processing priority of the present job.

Next, if the processing advances to Step S24, then [0] is substituted for the interrupt number $N_A$. Then, if the processing goes to Step S25, then it is checked whether a job waiting for output (a job being output is included) is present or not. Here, since the job generated first is still being output, it is judged [YES] and the processing is allowed to go to Step S26. In Step S26, the preprocessing time of a job having an output processing priority $P_B=P_A-1$ (in the above-mentioned case, because $P_B=P_A-1=2-1=1$, the firstly generated job provides the present job).

Next, if the processing advances to Step S27, then the interrupt number of a job having an output processing priority $P_B$ is read out. Here, to distinguish variables in a plurality of jobs, the preprocessing time of the job having the output processing priority $P_B$ is referred to as [preprocessing time B] and the interrupt number thereof is referred to as [interrupt number $N_B$. Next, if the processing goes to Step S28, then it is checked whether the interrupt number $N_B$ (=0) is less than a given value or not. If it is judged ΣYES] here, then the processing is allowed to go to Step S29, in which it is checked whether the preprocessing time A is less than the preprocessing time B or not.

As described above, the preprocessing time A is [10. 0] and the preprocessing time B is [1. 2]. Therefore, here, it is judged [NO] and thus the processing is made to go to Step S30. In Step S30, the job having this receive number N=2 is set in an output wait state. For the job having the receive number N=1, in Step S36, a postprocessing (output processing) is continued.

(3) Generation of Third Job

While an output processing relating to the facsimile function is being executed, if code data are supplied from the network line 12 through the network interface part 8, then the program shown in FIG. 5 is started in another task. In FIG. 5, if the processing advances to Step S21, then [receive number N=3] is given to a job relating to the present printer function.

Next, if the processing goes to Step S22, as described above, the subroutine shown in FIG. 2 is then called, a preprocessing (Steps S13–S18) relating to the printer function is executed, and a preprocessing time $T_P$ is found. When the processing goes back to the subroutine shown in FIG. 5, the thus found preprocessing time $T_P$ is substituted for the variable A. Here, it is assumed that the preprocessing time $T_P$ was [61.5]. Next, if the processing advances to Step S23, then the value (in the above-mentioned case, [3]) of the receive number N is substituted for the variable $P_A$ which represents the output processing priority of the present job.

Next, if the processing advances to S24, then [0] is substituted for the interrupt number $N_A$. After then, if the processing goes to Step S25, then it is checked whether a job waiting for output (a job being output is included) is present or not. Here, because the firstly and secondly generated jobs are still being output and waiting for output, it is judged [YES] and the processing is allowed to go to Step S26, in which the preprocessing time B of a job having the output processing priority $P_B=P_A-1$ (in the above-mentioned case, because of $P_B=P_A-1=3-1=2$, the secondly generated job is used as the present job) is read out.

Next, if the processing advances to Step S27, then the interrupt number $N_B$ in the job having the output processing priority $P_B$ is read out. After then, if the processing goes through Step S28 to Step S29, then it is checked whether the preprocessing time A (=61. 5) is less than the preprocessing time B (=10. 0) or not. Here, it is judged [NO] and the processing is allowed to go to Step S30. Therefore, the job having the receive number N=3 is also set in an output wait state.

(4) Generation of Fourth Job

Figures 3A, 3B, 3C, 4A, 4B:
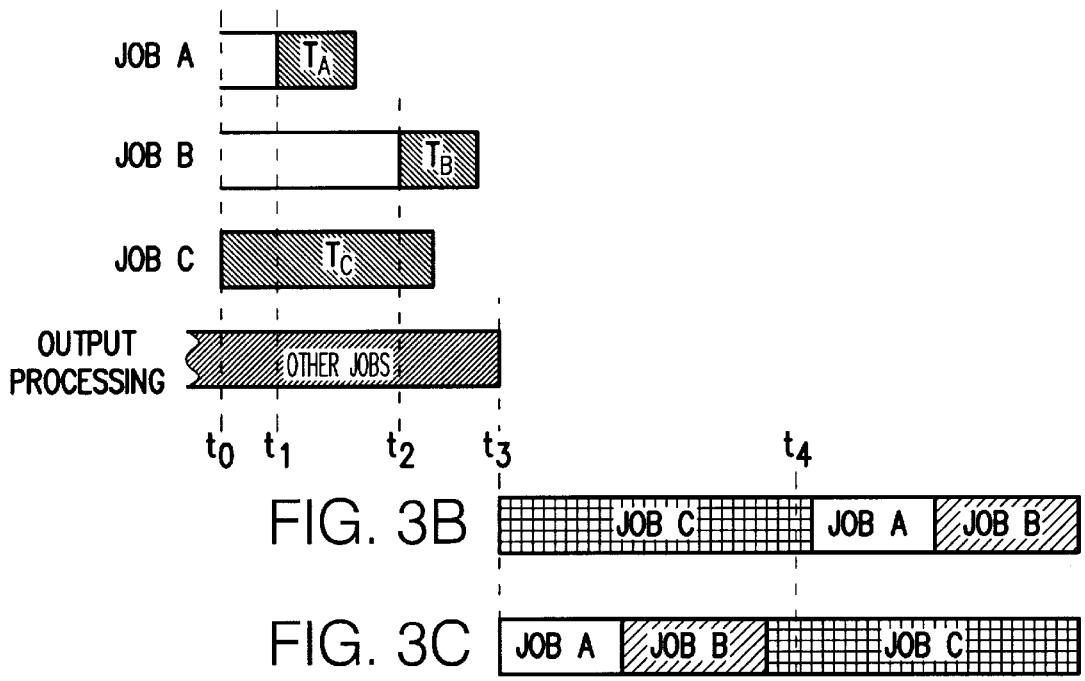
FIGS. 3A to 3C are explanatory views of the operation of the first embodiment.
FIGS. 4A and 4B are explanatory views of data to be stored in a processing order decide part.

Next, similarly to the third job, if code data are supplied from the network line 12 through the network interface part 8, then a fourth job is thereby generated. Assuming that the preprocessing of the fourth job was [157. 2], by means of processings similar to the above-mentioned jobs, the fourth job is also set in an output wait state. At this time, into the common areas of the respective tasks provided in the processing priority decide part 2a, there are stored such contents as shown in FIG. 4A.

(5) Generation of Fifth Job

Next, similarly to the second job, if the start button is pressed down, then the program shown in FIG. 5 is started again in another task. In FIG. 5, if the processing advances to Step S21, then [receive number N=5] is given to a job relating to the present copy function.

Next, if the processing goes to Step S22, as described above, a preprocessing relating to the copy function is then executed. Here, it is assumed that the preprocessing A calculated here was [5.1]. After then, in Step S23, [5] is substituted for the output processing priority $P_A$ and, in Step S24, [5] is substituted for the interrupt number $N_A$. If the processings of Steps S25 to S27 are executed, then the preprocessing time B (=157. 2) and interrupt number $N_B$ (=0) respectively relating to the job having the receive number N=4 are read out.

Next, if the processing advances to Step S29, then it is checked whether the preprocessing time A (=5. 1) is less than the preprocessing time B (=5. 1) or not. Here, it is judged [YES] and the processing is allowed to go to Step S32. In Step S32, the value of the output processing priority $P_A$ is substituted for the output processing priority $P_B$. That is, although the output processing priority of the job having the receive number N=4 has been 4 so far, it is lowered down to 5. After then, if the processing advances to Step S33, then the interrupt number $N_B$ relating to the receive number N=4 is incremented by 1. That is, since the interrupt number $N_B$ has been 0, it is increased up to 1 here.

Next, if the processing advances to Step S34, then the output processing priority $P_A$ is decremented by 1. That is, since the output processing priority $P_A$ of the job relating to the receive number N=5 has been 5, it is updated to 4 here. After then, if the processing goes to Step S35, then it is checked whether the output processing priority (=4) of the job having the receive number=5 is the highest priority or not. At the then time, because there are present the jobs (namely, the jobs respectively having the receive number= 1–3) having a higher priority than the present job, it is judged [NO] and the processing is allowed to return to Step S26.

Next, if the processings of Steps S26 and 27 are executed again, then the preprocessing time B (=61. 5) and interrupt number $N_B$ (=0) respectively relating to the job having the receive number N=3 are read out. Here, because the preprocessing time A (=5.1) is less than the preprocessing time B (=61. 5), it is judged [YES] in Step S29 and thus the processing of Step S35 is executed. That is, the output processing priority $P_B$ of the job having the receive number N=3 becomes 4, while the interrupt number $N_B$ thereof becomes 1. On the other hand, the output processing priority $P_A$ of the job having the receive number N=5 is set for 3.

After then, if the processing goes to Step S35, then it is checked whether the output processing priority (=3) of the job having the receive number N=5 is the highest priority or not. At the then time, because there are present the jobs having a higher priority (that is, the jobs respectively having the receive number N=1, 2), it is judged [NO] and thus the processing goes back to Step S26.

Next, in Steps S26–35, there are carried out similar processings to the above-mentioned ones. That is, since the preprocessing time A (=5. 1) of the job having the receive number N=5 is less than the preprocessing time B (=10. 0) of the job having the receive number N=2, the output processing priority $P_A$ of the former is set for 2, while the output processing priority $P_B$ of the latter is set for 3 and the interrupt number $N_B$ of the latter is set for 1.

Next, if the processings of Steps S26 and S27 are executed through Step S35, then the output processing priority $P_B$ and interrupt number $N_B$ of the job having the receive number N=1 are read out. Here, because the preprocessing time A (=5. 1) of the job having the receive number N=5 is not less than the preprocessing time B (=1. 2) of the job having the receive number N=1, the processing goes to Step S35, in which the job having the receive number N=5 is set in an output wait state. At the then time, into the common areas of the respective tasks provided in the process priority decide part 2a, there are stored such contents as shown in FIG. 4B.

(6) Processings to Follow

If the output processing of the job having the receive number N=1 is completed, then the task relating to the job having the receive number N=1 is ended and the tasks relating to the other jobs are informed of the effect that the task is ended. When the respective jobs receive this information while they are waiting for output (Step S30), then the respective processings go to Step S31. In Step S31, it is checked whether the output processing priority of the present job is the highest priority or not.

Since the job having the receive number N=1 is already ended, in this case, the output processing priority (=2) of the job having the receive number N=5 provides the highest priority. Therefore, in the present task, it is judged [YES] and the processing is allowed to go to Step S36. As a result of this, the output processing relating to the present task is executed. On the other hand, in the other tasks, [NO] is judged in Step S31 and thus they are set again into the output wait state. After then, similarly, the output processings are executed in the descending order of the output processing priorities.

(7) Others

By the way, when the output processings are executed on the jobs in such a manner that the priority is always given to the job having the shortest preprocessing time, there can happen such a case that lacks in validity. For example, when a job having a long preprocessing time is firstly received and a large number of jobs respectively having shorter preprocessing times are then received in succession, a user has to wait for a long time until the output processing of the job having the long preprocessing time is executed. In view of this, in the present embodiment, there is provided Step S28.

In other words, after the number of interrupts of the job having the long preprocessing time is equal to or more than a given value, if the present interrupt number is read out from other job as the interrupt number $N_B$, [NO] is judged in Step S28, so that the present other job is set into an output wait state. That is, the output processing priority of the job having the long preprocessing time can never be lowered further.

Also, in the operation described above with reference to FIG. 4B, the job having the receive number N=5 was given a higher output processing priority than the jobs respectively having the receive number N=2–4. In that case, the jobs having the receive number N=2–4 were set in the output wait state respectively. However, it can also be expected that they are being output (that is, the processing of Step S36 is under execution). For example, in FIGS. 4A and 4B, it is assumed that, after the job having the receive number N=1 is completed and the output processing of the job having the receive number N=2 is started, there is generated the job having the receive number N=5.

In such case, the output processing priority of the job having the receive number N=5 is higher than that of the job having the receive number N=2 which is currently under output processing. Thus, the processing of the job having the receive number N=2 is jumped to Step S30. Therefore, after the job having the receive number N=5 is completed, the processing of the job having the receive number N=2 is allowed to go to Step S36 through Step S31 and, in Step S36, the remaining output processing of the job is continued.

A-4. Effects of the Embodiment

Next, description will be given below of the effects of the present embodiment with reference to FIGS. 3A to 3C. In FIG. 3A, output processings relating to various jobs have been executed prior to a time $t_0$. Next, at the time $t_0$, a job C having a preprocessing time $T_C$ is generated, at a time $t_1$, a job A having a preprocessing time $T_A$ is generated, and, at a time $t_2$, a job B having a preprocessing time $T_B$ is generated. If the output processing of these jobs A–C are executed in the order of generation, then the execution sequence of the output processings of these jobs are as shown in FIG. 3B.

In the case shown in FIG. 3B, the jobs A and B have to wait until the job C having a long output processing time is completed. In contrast, according to the present embodiment, since the order of the output processings of the jobs is set as shown in FIG. 3C, a job having an output processing time can be processed in preference to others, so that the productivity of a plurality of jobs can be improved as a whole. By the way, the preprocessing time is not always in proportion to the postprocessing time accurately but there can be clearly recognized a correlation between them and, therefore, for almost all of jobs, the output processing priority is decided in the increasing order of the postprocessing time thereof.

B. Second Embodiment

B-1. Structure of the Embodiment

Figure 6:
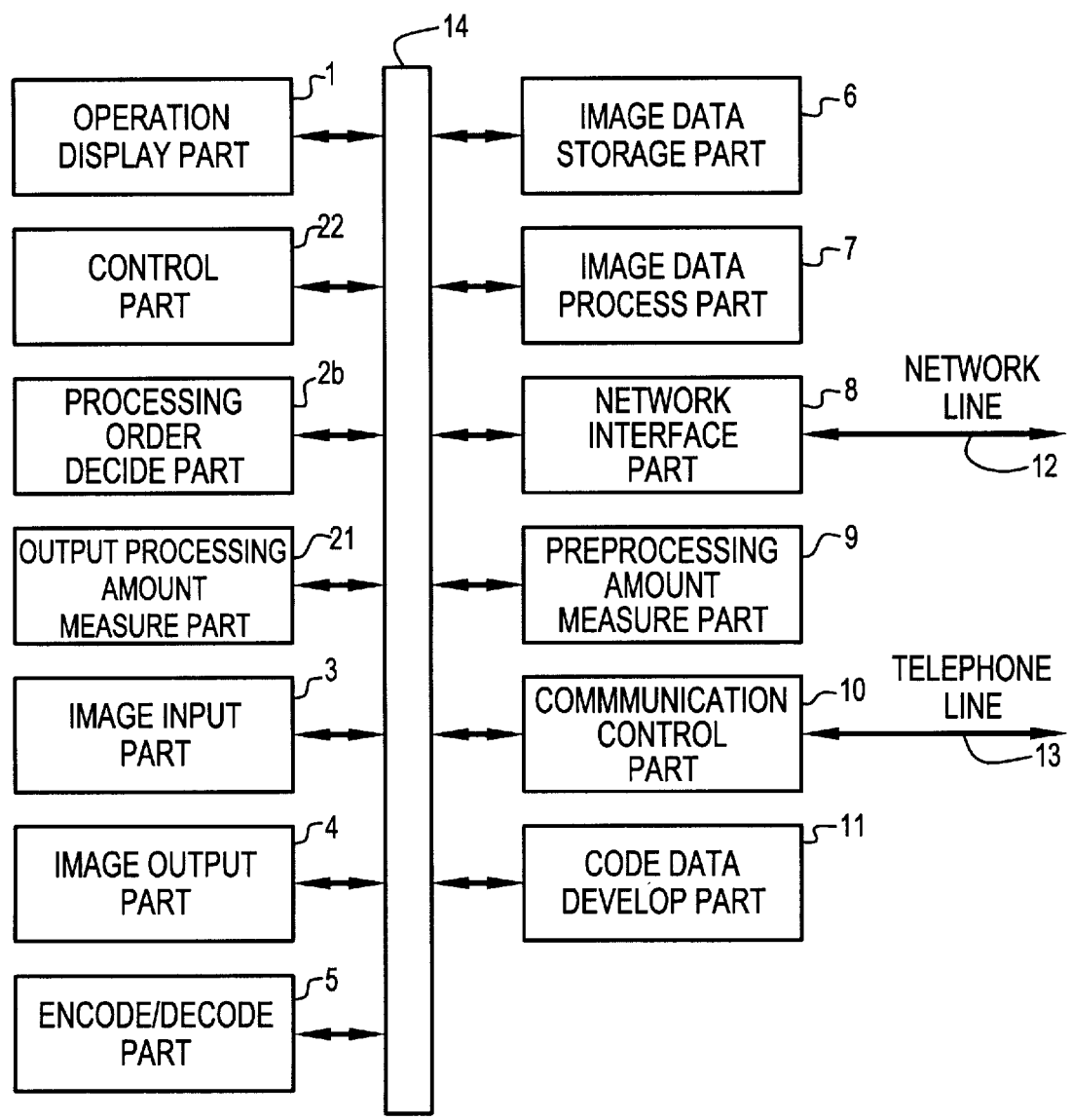
FIG. 6 is a block diagram of the structure of a second embodiment of an image processing device according to the invention.

Next, description will be given below of the structure of a second embodiment of an image processing device according to the invention with reference to FIG. 6. In FIG. 6, the parts thereof corresponding to those shown in FIGS. 1–5 are given the same designations and thus the description thereof is omitted here.

The second embodiment is characterized in that a postprocessing is performed in a time-shared manner and, therefore, it is necessary to determine a processing ratio for each of jobs. In FIG. 6, reference character 2b designates a processing ratio decide part which decides the above-mentioned processing ratio according to a processing to be discussed later. 21 stands for an output processing amount measure part which measures the number of pages already output with respect to jobs. 22 designates a control part which controls the respective parts of the present embodiment in accordance with a program to be discussed later.

B-2. Operation of the Embodiment (1) Generation of First Job

Figure 8:
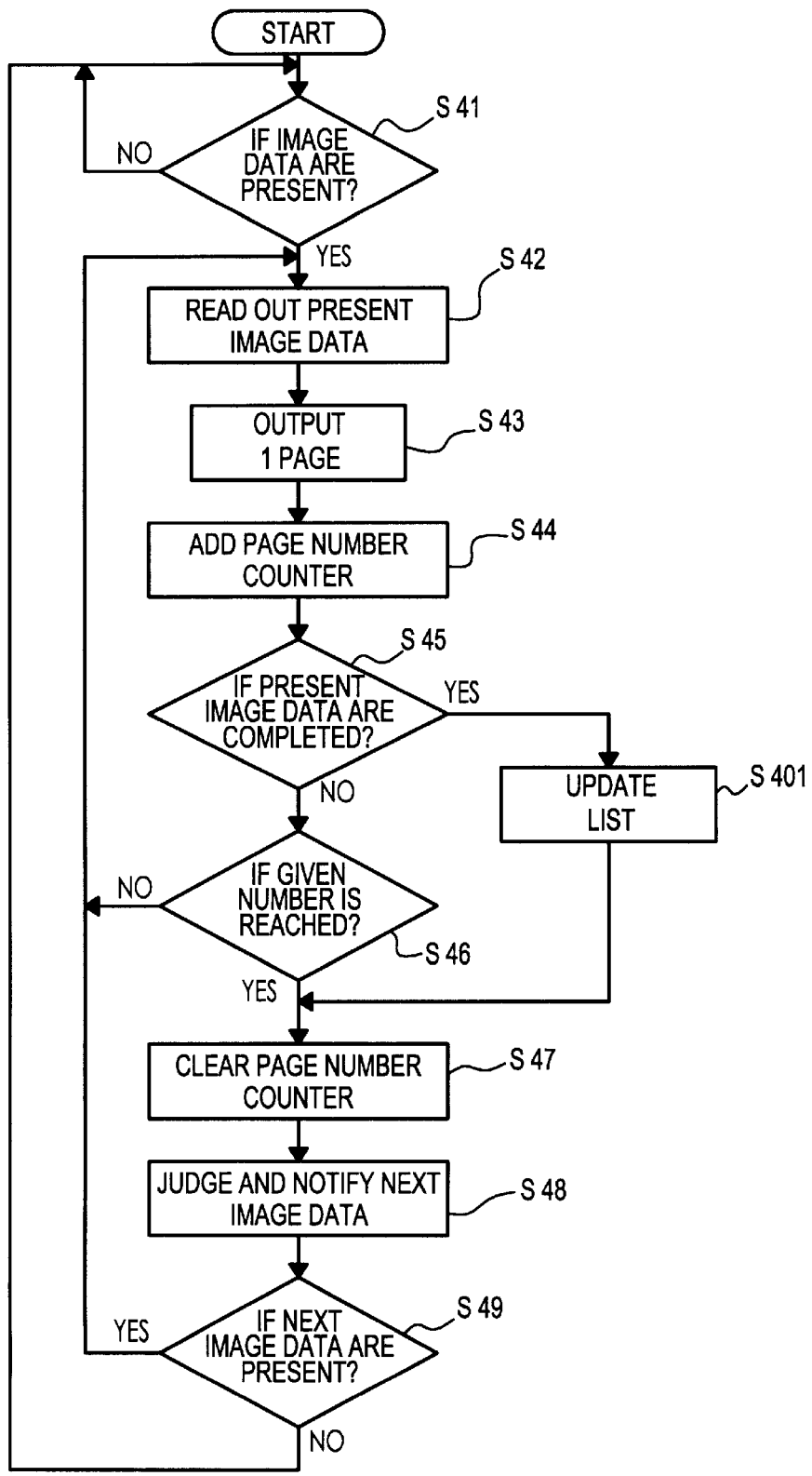
FIG. 8 is a flow chart of a control program employed in the second embodiment.

Next, description will be given below of the operation of the second embodiment. At first, when the power supply of the combined machine is put to work, then a main routine shown in FIG. 8 is started. In FIG. 8, if the processing advances to Step S41, then it is checked whether image data to be output is present or not. If not present, [NO] is judged and thus the processing is allowed to go to Step S41.

Figure 9:
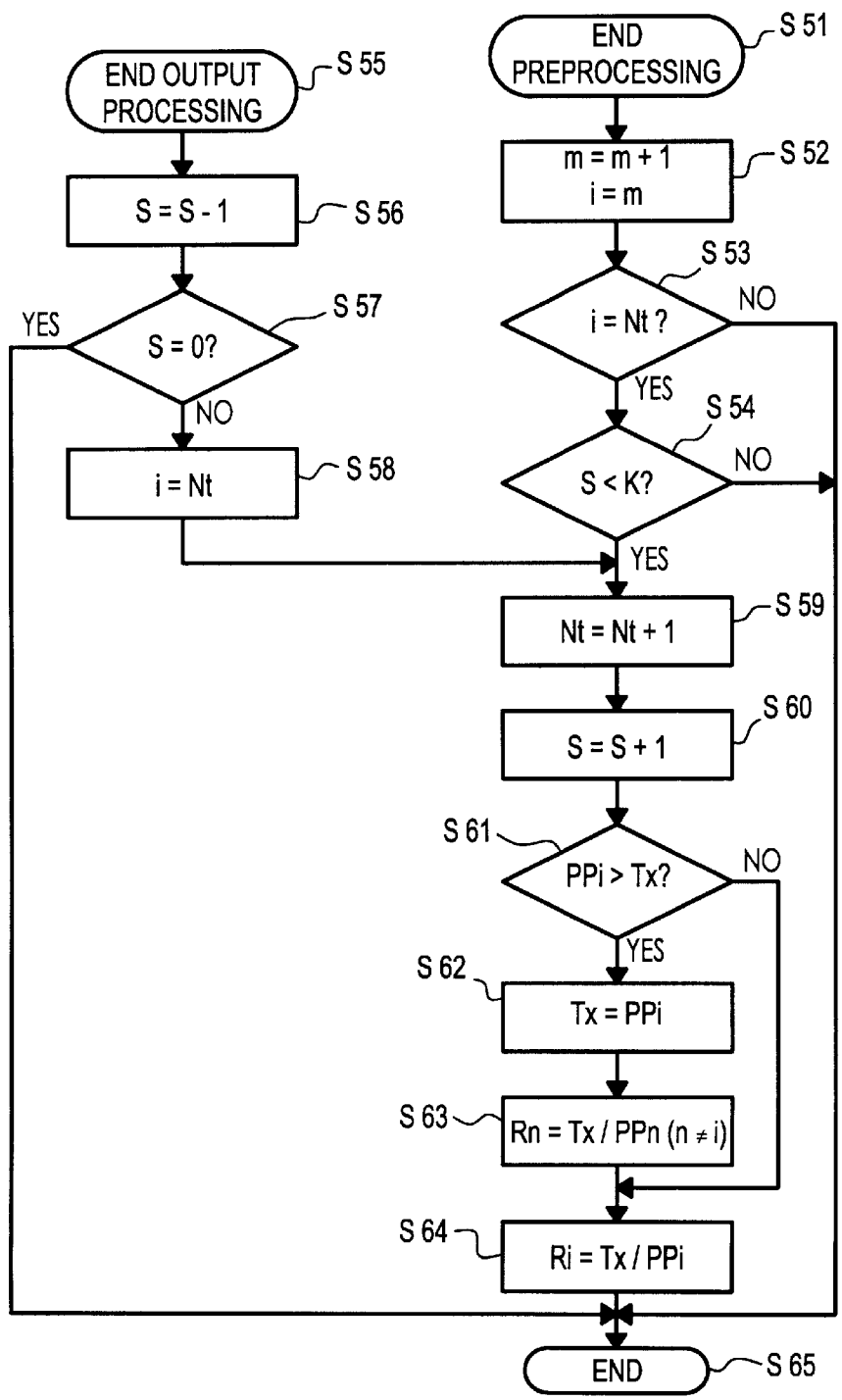
FIG. 9 is a flow chart of a control program employed in the second embodiment.

Next, if there is generated a job relating to any function, then there occurs an interrupt and thus the subroutine shown in FIG. 2 is started. By means of this, similarly to the first embodiment, there is found a preprocessing time for the present job. Here, in the present embodiment, the preprocessing time is expressed by a variable [PP]. Also, it is assumed here that the job generated relates to a copy function and the preprocessing time thereof PP was 5. 0. Next, in the processing ratio decide part 2b, a program shown in FIG. 9 is started. At the then time, the processing is started in Step S51.

In FIG. 9, if the processing goes through Step S51 to Step S52, then a receive number m is incremented by 1. Since the receive number m was initialized to 0 when the power supply of the combined machine was put to work, the receive member m becomes 1 here. After then, if the processing advances to Step S53, then it is checked whether a variable i is equal to a variable Nt or not. Here, the variable Nt is a variable representing the receive number of a job to be output processed next and was initialized to 1 when the power supply was put to work.

Because the above two variables are equal to each other, [YES] is judged and thus the processing is allowed to go to Step S54. By the way, the variable Nt is hereinafter referred to as an output wait leading receive number. Now, in Step S54, it is checked whether a variable S is less than a threshold value K or not. Here, the variable S represents the number of jobs which are currently being output processed in parallel and was initialized to 0 when the power supply was put to work. The variable S is hereinafter referred to as a parallel processing number. Also, the threshold value K expresses the maximum allowable value of the parallel processing number S and, in the present embodiment, is set to 3.

Therefore, here, YES] is judged and thus the processing is allowed to Step S59. In Step S59, the output wait leading receive number Nt is incremented by 1 to thereby become 2. Next, if the processing advances to Step S60, then the parallel processing number S is incremented by 1 to become 1. After then, if the processing goes to Step S61, then it is checked whether the preprocessing time $PP_i$ of a job having the variable i (at the current time, 1) as its receive number is more than a variable TX or not.

Here, the variable TX represents the greatest one of the preprocessing times PP of the jobs which are currently being output processed, and this variable is hereinafter referred to as a maximum preprocessing time. However, at the current time, there is present no job which is being output processed. In this case, the maximum preprocessing time TX is considered as 0. On the other hand, the preprocessing time $PP_i$ is 5. 0. Therefore, here, [YES] is judged and thus the processing is allowed to go to Step S62, in which the value 5. 0 of the preprocessing time $PP_i$ is substituted for the maximum preprocessing time TX.

Next, if the processing goes to Step S63, then there is found a processing ratio $R_n$ (=maximum preprocessing time TX×preprocessing time $PP_j$, where fractions of 0. 5 and over are counted as a unit and the rest is cut away.) with respect to a receive number n where i≠n. However, at the then time, the number of jobs which have been received is 1 and, therefore, there does not exist the receive number n that satisfies the condition of i≠n. For this reason, any substantial processing is not performed in Step S63 but the processing advances to Step S64.

In Step S64, a processing ratio $R_i$ (=maximum preprocessing time TX×preprocessing time $PP_i$) for the receive number i is found. Here, since the maximum preprocessing time TX and preprocessing time $PP_i$ are both 5. 0, the processing ratio $R_i$ becomes 1. If the above steps are completed, then the processings in the processing ratio decide part 2b are completed. Here, the above-mentioned various variables are respectively stored in a given common area within the processing ratio decide part 2b in correspondence to the receive number i=1.

Now, when the preprocessing for the firstly generated job is executed, the code data obtained as the results of the preprocessing, as described previously in connection with the first embodiment, are stored into the image data storage part 6. Then, since the above-mentioned processings are executed within the processing ratio decide part 2b, the values of the various variables are stored in the common areas of the processing ratio decide part 2b. In the present embodiment, such state is considered as a state in which image data to be output processed are generated. Therefore, if the processing of Step S41 is executed again in the main routine (FIG. 8), then [YES] is judged and thus the processing is allowed to go to Step S42.

In Step S42, the control part 22 outputs a command to the respective parts of the present embodiment so that the first page can be output in a job having the receive number [1]. As a result of this, in accordance with the condition that is previously set in the operation display part 1, the code data on the page to be output firstly are sequentially read out and are then supplied to the encode/decode part 5. Then, the present code data are decompressed and decoded to the image data and, after then, they are supplied to the image output part 4 and are then output to a recording sheet.

On the other hand, the processing in the control part 22 advances to Step S43 and waits until the output of the first page is completed. If the output of the first page is completed, then a page termination signal is supplied from the image output part 4 to the control part 22. As a result of this, the processing goes to Step S44, in which a given page number counter is incremented by 1. Because the page number counter was initialized to 0 when the power supply of the combined machine was put to work, the count number becomes 1. Also, the number of pages already output is stored in the common area of the processing ratio decide part 2b in correspondence to the respective jobs. If the output processing amount measure part 21 detects the above-mentioned page termination signal, then it allows the page number corresponding to the present job to be incremented by 1.

Next, if the processing advances to Step S45, then it is checked whether the output of the image data of all pages of the present job is completed or not. If not yet completed, then [NO] is judged and thus the processing is allowed to go to Step S46. In this step, it is checked whether the count value of the page number counter reaches a given value or not. For reference, the given value used here means a value of the product of the minimum output page number multiplied by the processing ratio of the present job. Also, the minimum output page number is a value which represents the lowest number of pages which must be output, and the minimum output page number can be set arbitrarily by the user.

Here, if it is assumed that the minimum output page number is 2, then the present given value also becomes 2 and the count value (=1) does not reach the present given value, so that [NO] is judged and thus the processing is made to return back to Step S42. Therefore, through Steps S42 and S43, the image data of the second page having the receive number 1 are output from the image output part 4 to a sheet or the like. Then, the count value of the page number counter is incremented to become 2. As a result of this, in Step S46, [YES] is judged and thus the processing is allowed to go to Step S47. In Step S47, the count value of the page number counter is cleared to 0.

(2) Generation of Second Job

Here, if there is generated a new job relating to the printer function, similarly to the first job, the subroutine shown in FIG. 2 is then started. As a result of this, there is obtained a preprocessing time for the present job. Here, it is assumed that the preprocessing time for the second job relating to the printer function was 31. 0. Next, in the processing ratio decide part 2b, the program shown in FIG. 9 is started. In this case as well, the processing is started in Step S51.

In FIG. 9, if the processing advances through Step S51 to Step S52, then the receive number m is incremented by 1. The receive number m becomes 2 here because it was set to 1 when the first job was generated. Also, 2 is substituted for the variable i. Next, if the processing goes to Step S53, then it is checked whether the variable i is equal to the output wait leading receive number Nt or not. Here, since the output wait leading receive number Nt was previously set to 2 when the processing of Step S59 was executed, [YES] is judged and thus the processing is allowed to go to Step S54.

In Step S54, it is checked whether the parallel processing number S is less than the threshold value K or not. Here, the variable S was previously set to 1 in Step S60. Also, as described above, the threshold value K is set to 3 in the present embodiment. Therefore, here, [YES] is judged and thus the processing is allowed to go to Step S59. Next, in Steps S59 and S60, the output wait leading receive number Nt and parallel processing number S are respectively incremented by 1, so that they become 3 and 2 respectively.

Next, if the processing advances to Step S61, then it is checked whether the preprocessing time $PP_i$ ($=PP_2=31.0$) is more than the maximum preprocessing time TX or not. Here, since a job being currently output processed is only the job that was generated first, the preprocessing time $PP_i$ ($=5.0$) of the firstly generated job becomes the maximum preprocessing time TX. Therefore, here, [YES] is judged and thus the processing is allowed to go to Step S62. In this case, the preprocessing time $PP_i$ ($=PP_2$) is substituted for the maximum preprocessing time TX.

Next, if the processing advances to Step S63, then there is obtained a processing ratio $R_n$ (=maximum preprocessing time TX×preprocessing time $PP_n$) for a receive number n where 1≠n. That is, a processing ratio $R_1$ for a receive number 1 becomes here [31. 0/5. 0≈6]. Then, if the processing advances to Step S64, then a processing ratio $R_2$ for a receive number 2 is set to [1 (=31.0/31.0)]. If the above steps are completed, then the processings in the processing ratio decide part 2b are completed. By the way, the above-mentioned various variables are respectively stored in their given common areas within the processing ratio decide part 2b in correspondence to the receive number i=2.

(3) Generation of Third Job

Here, if there is generated a new job relating to the copy function, as described above, the subroutine shown in FIG. 2 is then started. As a result of this, there is obtained a preprocessing time for the present job. Here, it is assumed that the preprocessing time PP of the third job relating to the copy function was 14. 0. Next, the program shown in FIG. 9 is started in the process ratio decide part 2b. In this case as well, the processing is started in Step S51.

In FIG. 9, if the processing advances through Step S51 to Step S52, then the receive number m and variable i are set to 3 respectively. Also, since the output wait leading receive number Nt and parallel process number S were previously set to 3 and 2 respectively in Steps S59 and S60, in Steps S53 and S54, ΣYES] is judged for both of them. Thus, Steps S59 and S60 are executed again and the output wait leading receive number Nt and parallel process number S are set to 4 and 3 respectively.

Here, because the maximum processing time TX (=31. 0) is not less than the preprocessing time $PP_3$ (14. 0), in Step S61, [NO] is judged and, in Step S64, a processing ratio $R_3$ is set to [2 (≈31. 0/14. 0)]. If the above steps are completed, then the above-mentioned various variables are respectively stored in their given common areas within the processing ratio decide part 2b in correspondence to the receive number i=3.

(4) Generation of Fourth Job

Here, if there is generated a new job relating to the facsimile function, as described above, the subroutine shown in FIG. 2 is then started. As a result of this, there is obtained a preprocessing time for the present job. Here, it is assumed that the preprocessing time PP of the fourth job relating to the facsimile function was 1. 8. Next, the program shown in FIG. 9 is started in the processing ratio decide part 2b. In this case as well, the processing is started in Step S51.

In FIG. 9, if the processing advances to Step S52 through Step S51, then the receive number m and variable i are set to 4 respectively. Because the output wait leading receive number Nt was set previously to 4 in Step S59, in Step S63, [YES] is judged. However, since the parallel processing number S was previously set to 3, in Step S54, [NO] is judged. Therefore, the processings in the processing ratio decide part 2b are terminated here.

(5) Generation of Fifth and following Jobs

After then, if there is generated a job similarly, then a preprocessing is executed and, after then, Step S52 is executed, the receive number m is incremented by 1 and the result of this is substituted for the variable i. However, since Step S59 was not executed when the fourth job was generated, the output wait leading receive number Nt has been remaining 4. For this reason, with respect to the fifth and its following jobs, [NO] is judged in Step S53 and the processings in the processing ratio decide part 2b are terminated here.

In this manner, if a plurality of jobs are generated sequentially, then in the common areas of the processing ratio decide part 2b, there are stored data having such contents as shown in FIG. 7 (which is hereinafter referred to as a job list). That is, in the job list, for each of the jobs, there are stored a receive number, a function, a sheet size, the number of pages, the number of copies, a preprocessing time, a processing ratio, the amount of processings already output (the number of pages already output), and the like. Based on whether a processing ratio is given to each of the jobs or not, the state of the job (the job is under processing or is unprocessed) is stored.

(6) Output Processing

In the main routine (FIG. 8), if the processing advances to Step S48, then a job to be output processed next is decided. That is, each job becomes a target to be output processed with frequency proportional to the processing ratio thereof. Next, if the processing goes to Step S49, then it is checked whether image data to be output next are present or not, that is, it is checked whether the job previously considered to be output processed in Step S48 is present or not.

If it is judged [YES] here, then the processing is allowed to go to Step S42, in which the job previously decided in Step S48 is output processed. That is, the processings of Steps S42–S46 are executed by the number of times corresponding to a given number of pages (=minimum output page number×processing ratio) and the image data relating to the present job are output. After then, in Step S47, the page number counter is cleared and, in Step S48, a job to be output processed next is decided again.

If such processings are executed repeatedly, then the amounts of processings already output relating to the jobs respectively having the receive numbers 1–3 (see FIG. 7) increase almost in proportion to the processing ratios of the respective jobs. As a result, for any one of the jobs, the output processings of all pages will be finally terminated. In the case shown in FIG. 7, as for the job having the receive number 1, since the number of pages is 5 and the number of copies is 3, the number of all pages to be output becomes 15.

Also, the amount of the processings output so far is 14. Therefore, when the present job is decided again a target to be output processed, it is sure that the output processings of all pages thereof will be terminated.

In this case, if the output of the final page is completed and the processing advances to Step S45, then [YES] is judged here and thus the processing is allowed to go to Steps S401, so that the job list is updated. In particular, the contents relating to the job having the receive number 1 are removed from the job list. Then, a given control signal is supplied from the control part 2 to the processing ratio decide part 2b and, in the processing ratio decide part 2b, the processings of Step S55 and its following steps shown in FIG. 9 are executed. On the other hand, in the control part 2, the processing is made to wait until the processings of the processing ratio decide part 2b are terminated.

Now, in FIG. 9, if the processing advances through Step S55 to Step S56, then the parallel processing number S is decremented by 1. Here, the parallel processing number S was set to 3 in Step S60 when the job having the receive number 3 was previously generated, and it has been left unchanged since then. Therefore, the parallel processing number S becomes 2 in Step S56. Next, in Step S57, it is checked whether the parallel processing number S is 0 or not. Of course, it is judged [NO] here and thus the processing is allowed to go to Step S58, in which the output wait leading receive number Nt is substituted for the variable i.

Here, the output wait leading receive number Nt was set to 4 when the job having the receive number 4 was generated and has been left unchanged since then. Therefore, 4 is substituted for the variable i. Then, through Steps S59 and S60, the output wait leading receive number Nt and parallel processing number S are set to 5 and 3, respectively. Next, if the processing advances to Step S61, then it is checked whether a preprocessing time $PP_4$ is more than the maximum preprocessing time TX or not.

As described above, the variable TX is the largest (in the case shown in FIG. 7, $PP_2=31.0$) in the preprocessing times PP of the jobs (which respectively have the receive numbers 2 and 3) being currently output processed. On the other hand, the preprocessing time $PP_4$ is 1.8. Therefore, [NO] is judged here and thus the processing is made to go to Step S64. Accordingly, the processing ratio $R_4$ of the job having the receive number 4 is set to 17 ($\approx 31.0/1.8$).

If the above steps are completed, then the above-mentioned various variables are stored in the job list in correspondence to the receive number i=4. Due to this, in the control part 2, the processing of Step S401 is terminated and the processings of Step S47 and its following steps are continued. That is, in accordance with the processing ratios of the respective jobs, the output processings of the jobs respectively having the receive numbers 2–4 are continued.

B-3. Effects of the Second Embodiment

As has been described above, according to the present embodiment, for the respective jobs, the shorter the preprocessing time is, the higher processing ratio can be given. That is, a job having a short output processing time can be processed in preference to others, which makes it possible to improve the productivity of a plurality of jobs as a whole.

C. Third Embodiment

C-1. Summary of the Third Embodiment

In the above-mentioned first and second embodiments, on the assumption that the order of the magnitude of the preprocessing amounts (preprocessing times) are almost in agreement with the order of the magnitude of the postprocessing amounts, the processing order or the processing ratio is decided according to the preprocessing times. However, even when the preprocessing time is not measured actually, it is possible to predict or estimate the preprocessing time to a certain degree.

Figure 10:
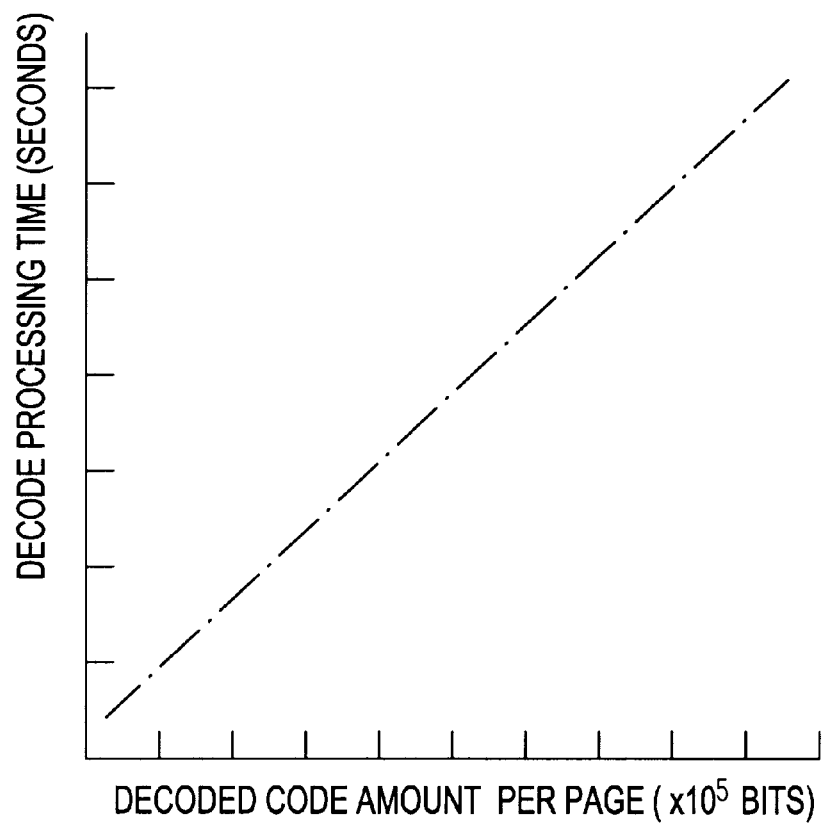
FIG. 10 is an explanatory view of the operation of a third embodiment of an image processing device according to the invention.

For example, when the facsimile function is selected, the decode processing time of the code data varies according to the amounts of codes to be decoded (see FIG. 10). Similarly, the decomposing time of the code data described in a page descriptive language (time necessary for development of the code data into bit map data) varies according to the amounts of the code data to be processed. In other words, based on the amounts of the code data received, a processing time necessary to restore them to the image data can be estimated.

Also, when the copy function is selected, if the size of the image data to be output onto a recording sheet (the size of the recording sheet) is decided, then there arises a need to take in the image data corresponding to the recording sheet size from the image input part 3. Therefore, when there is employed a system in which the image input part 3 samples the image data by use of a clock having a given cycle, the operation time of a scanner can be estimated.

Further, when the printer function is selected, the code data described in a page descriptive language are converted to bit map data in accordance with the image size information. Therefore, if the image size information such as the size of a recording sheet and the like is specified, then the decomposing time can be estimated roughly.

Accordingly, the present embodiment aims at estimating the preprocessing time based on the above-mentioned principles.

C-2. Structure of the Third Embodiment

Figure 11:
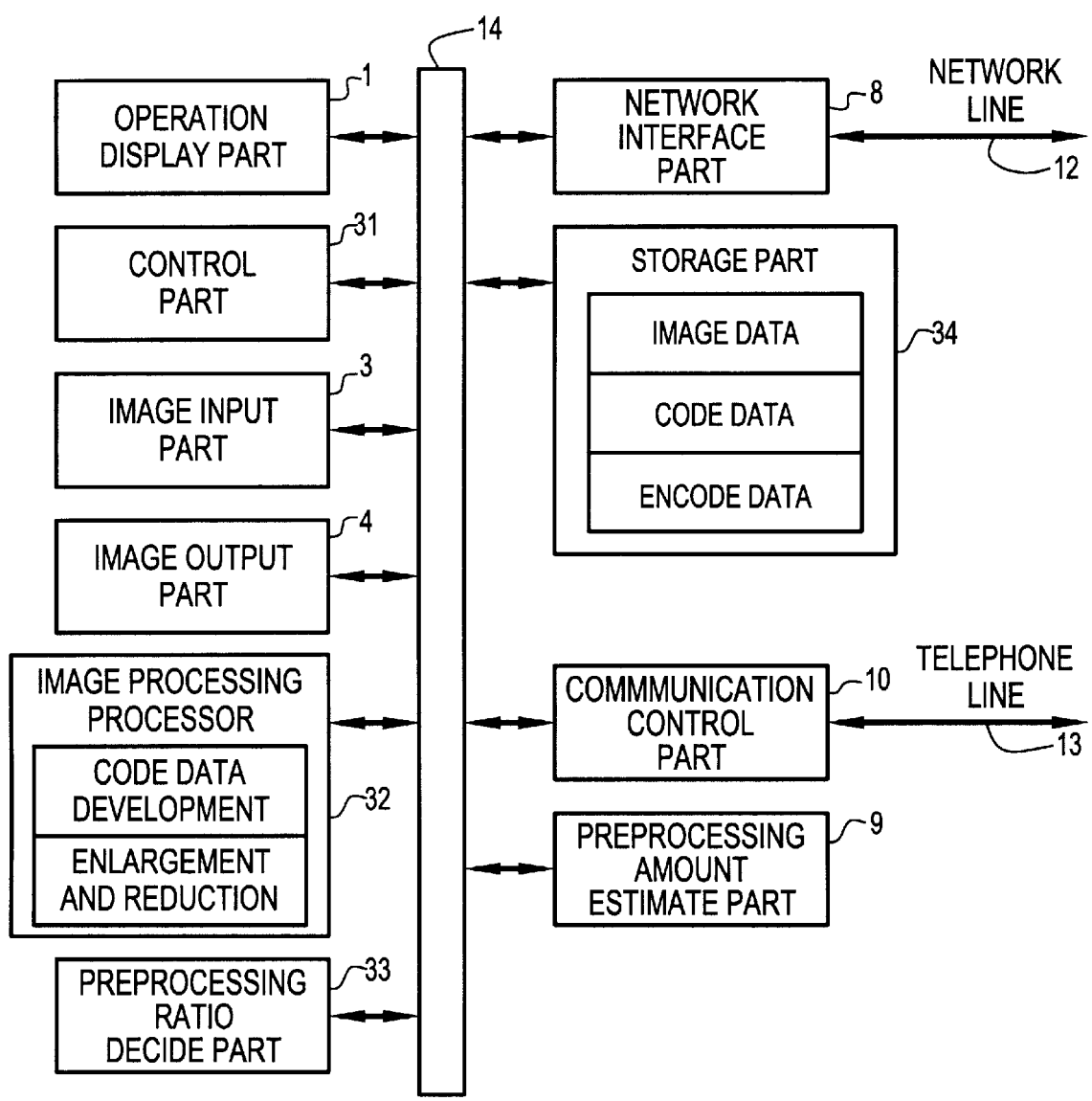
FIG. 11 is a block diagram of the structure of the third embodiment.

Next, description will be given below of the structure of the third embodiment according to the invention with reference to FIG. 11. In FIG. 11, parts corresponding to those shown in FIGS. 1–9 are given the same designations and the description thereof is omitted here.

In FIG. 11, reference character 35 designates a preprocessing amount estimate part which, under the control of a control part 31, calculates the preprocessing estimate times (which will be discussed later in detail) for the respective functions. 32 stands for an image processing processor which executes various image processings.

The above-mentioned various image processings include a processing for encoding various pieces of image data, a processing for decoding the code data, a processing for decomposing the code data in the printer function, an enlarge/reduce processing including a resolving power conversion processing for converting the resolving power of the input image data to the resolving power of the image output part 4, a rotation processing for matching the direction of the image data to the direction of a recording sheet usable in the image output part 4, and the like.

Now, 34 designates a storage part consisting of a memory device which stores therein image data input from the image input part 3, image data to be output processed in the image output part 4, code data described in a page descriptive language and received by the network interface part 8 from externally through the network line 12, and facsimile code data received by the communication control part 10 from externally through the telephone line 13, in such a manner that these data are stored independently of one another.

The above-mentioned preprocessing amount estimate part 35, when the copy function is selected, takes therein information on the recording sheet size selected by the operation display part 1 when the start button is pressed down. This makes it possible to estimate the time for the image input part 3 to take in the necessary image data. Also, when the facsimile function is selected, the preprocessing amount estimate part 35, in accordance with a relation between the code data amount and the decode processing time (see FIG. 10), estimates the present decode processing time.

Further, when the printer function is selected, the preprocessing amount estimate part 35 estimates the time necessary for the decompose processing in accordance with the amounts of the code data taken into the storage part 34. Now, 33 stands for a preprocessing ratio decide part which, under the control of the control part 31, decides the preprocessing ratios of the respective jobs.

C-3. Operation of the Third Embodiment

Next, description will be given below of the operation of the present embodiment. The operation of the present embodiment is similar to that of the second embodiment but is different from it in the contents of the preprocessing. At first, in the present embodiment, when a job is generated, the preprocessing thereof is not executed immediately but the estimation of the preprocessing is executed. In particular, instead of the program shown in FIG. 2, a program shown in FIG. 12 is started.

Figure 12:
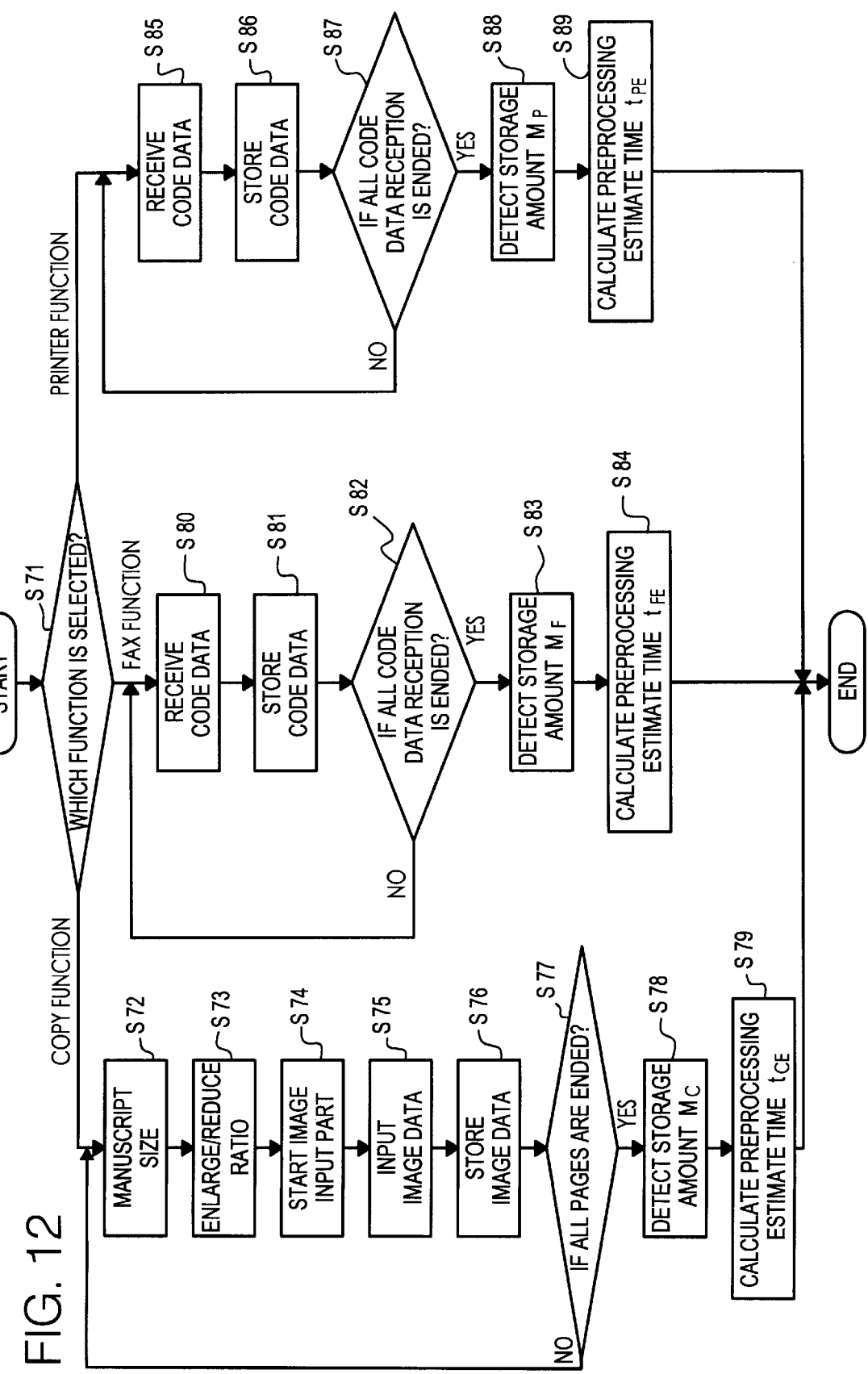
FIG. 12 is a flow chart of a control program employed in the third embodiment.

In the program shown in FIG. 12, the actual preprocessings of the job such as the encode/decode processing (Step S8 shown in FIG. 2), the processing for converting the code data to the bit map image data (Step S14 shown in FIG. 2) and the like are not executed but a simple data storage processing is executed. Also, these preprocessings are executed in parallel by the image processing processor 32 according to a similar technique to the postprocessing of the second embodiment. Now, description will be given below of the contents of the estimate operation of the preprocessing time of the present embodiment according to the respective functions.

(1) Copy Operation

Similarly to the second embodiment, when copying a manuscript, the user performs a given operation on the operation display part 1 to thereby set the function of the combined machine to the copy function, sets the number of copies, a copying magnification and the like as the need arises, and places the manuscript onto the platen glass. After then, if the user presses down a given start button, then a new job is generated and a receive number is given to the present job. Then, the program shown in FIG. 12 is started.

In FIG. 12, if the processing advances to Step S71, then the processing is branched according to the currently selected function of the combined machine. In the above-mentioned case, since the copy function is selected, the processing is allowed to go to Step S72. In Step S72, the size of the manuscript set in the image input part 3 is detected by a well-known manuscript size sensor (not shown) and the detected result is stored as manuscript size information Sz.

Next, if the processing goes to Step S73, then the enlarge/reduce information Re previously set in the operation display part 1 is fetched. Then, if the processing advances to Step S74, then the image input part 3 is started and the image data on the manuscript are input. After then, in Steps S75 and S76, the input image data are stored into the storage part 34.

Then, if the processing advances to Step S77, then it is checked whether the reading of all pages of the manuscript is completed or not. If it is judged [NO] here, then the processing goes back to Step S72. Therefore, the processings of Steps S72–S77 are performed repeatedly until the whole manuscript relating to one copy job is read in. If the reading of the whole manuscript is completed, then the processing is allowed to advance to Step S78, in which the storage amount $M_C$ of the image data stored in correspondence to the present job is detected.

Next, if the processing advances to Step S79, then the preprocessing amount estimate part 35 calculates a preprocessing estimate time $t_{CE}$ based on the detected storage amount $M_C$. Here, the preprocessing estimate time $t_{CE}$ can be obtained, for example, by multiplying the storage amount $M_C$ by a given constant and the enlarge/reduce information Re. If the above steps are completed, then the processings of the program shown in FIG. 12 are terminated. After then, similarly to the second embodiment, a processing ratio is given to the present job.

When deciding the processing ratio, the preprocessing estimate time $t_{CE}$ is used in place of the preprocessing time $T_C$ employed in the second embodiment. In the present embodiment, after the processing ratio is decided, the actual preprocessings of the present job such as an image enlarge/reduce processing, an image rotation processing and the like are executed. Also, to save the capacity of the storage part 34, an image data encode processing is executed as the need arises. If the preprocessings are terminated, then the postprocessings of the present job are executed in accordance with the above-mentioned processing ratio.

(2) Facsimile Reception

Also, if a call is issued from the other facsimile through the telephone line 13, then an interrupt is generated by the communication control part 10 and, in the control part 31, the function of the combined machine is set to the facsimile function. Similarly to the first embodiment, a receive number N is given to the present job and the subroutine shown in FIG. 12 is started again. In this case, the processing is allowed to advance through Step S71 to Step S80.

On the other hand, the communication control part 10 receives the modem modulated code data from the telephone line 13 and then modem demodulates the received code data. After then, the thus demodulated code data are transmitted to and received by the control part 31. Next, if the processing advances to Step S81, then the present code data are stored in the storage part 34. After then, if the processing goes to Step S82, then it is checked whether the reception of all the code data is completed or not. If it is judged [NO] here, then the processing is made to return back to Step S80. Therefore, while the code data are being received, the processings of Steps S80–S82 are performed repeatedly.

If the reception of the code data is completed, then the processing advances to Step S83, in which there is detected the storage amount $M_F$ of the code data stored in correspondence to the present job. Next, if the processing goes to Step S84, then the preprocessing amount estimate part 35 calculates a preprocessing estimate time $t_{FE}$ based on the storage amount $M_F$ detected. These processings are similar to those of Steps S78 and S79. Then, if the above steps are completed, then the processings of the program shown in FIG. 12 are completed.

After then, similarly to the second embodiment, a processing ratio is given to the present job. When deciding this processing ratio, the preprocessing estimate time $t_{FE}$ is used in place of the preprocessing time $T_F$. Next, similarly to the case of the copy function, the preprocessing and postprocessing are executed in accordance with the processing ratio.

(3) Print Operation

If the code data described in a page descriptive language (PDL) are supplied through the network line 12, then the code data are received by the network interface part 8. As a result of this, an interrupt is generated by the network interface part 8 and, in the control part 31, the function of the combined machine is set to the printer function. In this case as well, similarly to the first embodiment, the receive number N is given to the present job and the subroutine shown in FIG. 12 is started again. Thus, the processing is allowed to advance through Step S71 to Step S85.

In Steps S85 and S86, the code data are received by the network interface part 8, and they are then stored into the storage part 34. Next, if the processing advances to Step S87, then it is checked whether the reception of all the code data is completed or not. If it is judged [NO] here, then the processing is made to return back to Step S80. Therefore, during the reception of the code data, the processings of Steps S85–S87 are carried out repeatedly.

Then, if the reception of the code data is completed, then the processing is allowed to go to Step S88, in which there is detected the storage amount $M_P$ of the code data stored in correspondence to the present job. Next, if the processing advances to Step S89, then a preprocessing estimate time $t_{PF}$ is calculated by the preprocessing amount estimate part 35 in accordance with the storage amount $M_P$ detected. These processings are similar to those of Steps S78 and S79. If the processings of the above steps are terminated, then the processings of the program shown in FIG. 12 are terminated.

After then, similarly to the second embodiment, a processing ratio is given to the present job. When deciding this processing ratio, the preprocessing estimate time $t_{PF}$ is used in place of the preprocessing time $T_P$ employed in the second embodiment. Also, similarly to the case of the copy function, the preprocessing and postprocessing are executed sequentially according to the present processing ratio. However, the term "preprocessing" used here includes a processing for converting the code data to bit map image data, and other similar processings.

C-4. Effects of the Third Embodiment

As has been described above, according to the present embodiment, the preprocessing time can be estimated prior to actual execution of the preprocessing, which makes it possible to decide the processing ratio in advance. That is, when a job has a short preprocessing time, a high processing ratio can be given to the preprocessing itself of the present job. Thanks to this, a job having a short preprocessing time can be generally processed in preference to other jobs, thereby being able to further improve the productivity of a plurality of jobs as a whole.

D. Modifications

The present invention is not limited to the above-mentioned embodiments but, for example, various modifications are possible as follows.

D-1. In the above-mentioned respective embodiments, the postprocessing means an image forming processing, while the preprocessing means a processing which is executed prior to formation of an image. However, the preprocessing and postprocessing of the invention are not limited to this. That is, a series of processings are executed from the generation of a job to the formation of an image. Out of such series of processings, one or more arbitrary processings can be considered as the preprocessing, while one or more arbitrary processings to be executed after execution of the preprocessing can be considered as the postprocessing.

D-2. In the above-mentioned respective embodiments, various processings are dispersed into a plurality of blocks before they are executed. However, these processings can also be executed by a single central processing unit. For example, the functions of the control part 2, processing priority decide part 2a and processing ratio decide part 2b in the first and second embodiments can also be performed by a single central processing unit.

D-3. In the printer function of the first and second embodiments, the partial preprocessing time $t_{Pi}$ was measured on the assumption that the page split symbol is contained in the code data. However, in the page descriptive language, there are present some code data for which a page split symbol need not be specified clearly. In such case, while the code data are being converted to the bit map image data, at a time when the bit map image data corresponding to one page are developed, the division of one page may be recognized.

D-4. In the above-mentioned respective embodiments, the processing times in the network interface part 8 and communication control part 10 are not included in the preprocessing time. This is because a transmission speed varies greatly according to data communication systems. However, when the data communication systems are limited to several kinds, the processing time of the network interface part 8 or communication control part 10 may be multiplied by a coefficient (a value corresponding to each of the data communication systems) and the preprocessing time may then be found according to the result thereof.

D-5. In the first embodiment, if a job having a short preprocessing time is generated while a job having a long preprocessing time is being output processed, in principle, the former is processed in preference to the latter. However, according to cases, such way of processing can lack in validity. For example, it is assumed that a job being currently output processed is a job which is requested to output 1000 pieces of recording sheets, and also that, out of 1000 pieces, 990 pieces have been already output. Here, if there is generated a job requested to output 100 pieces of recording sheets, then the former job is interrupted here and is made to wait until the latter job is completed, in spite of the fact that whole output processing of the former job can be completed by outputting only 10 more pieces.

In order to avoid such inconvenience, the preprocessing time may be decremented according to the number of recording sheets output. For example, all of the partial preprocessing times may be previously stored in the control part 2 and, each time the image formation of 1 page is carried out, the present partial preprocessing time may be subtracted from the corresponding preprocessing time. Also, the preprocessing time firstly obtained (that is, obtained in Steps S6, S12 and S18) may be multiplied by [the number of sheets left to be output/the number of all sheets output] and the result thereof may be used as the preprocessing time.

D-6. In the above-mentioned respective embodiments, the processing order or processing ratio of the postprocessing is decided in such a manner that a job having a shorter preprocessing time is given priority in execution. But, instead, in a job having a longer preprocessing time, the postprocessing thereof may be given priority in execution. Especially, as in the third embodiment, when the preprocessings are processed in parallel, the job having a long preprocessing time is lowered in the processing ratio and, therefore, it can be considered that such job has already paid the penalty that the preprocessing is slow. Accordingly, in such case, it is rather preferable sometimes that the postprocessing thereof is given priority in execution.

D-7. In the third embodiment, the processing ratio is decided in accordance with the estimation result of the preprocessing time, while the preprocessing and postprocessing are executed in parallel. However, alternatively, the processing order may be decided in accordance with the estimation result of the preprocessing time, while the preprocessing and postprocessing may be executed collectively for each job. For example, if the preprocessings are executed in the increasing order of the preprocessing estimation time to thereby arrange the image data sequentially, then the image output part 4 can be operated effectively.

D-8. Similarly, in the third embodiment, alternatively, the preprocessings may be executed in accordance with the processing order for each job and the postprocessings may be executed in parallel in accordance with the processing ratios thereof.

D-9. Also, in the third embodiment, the processing ratio is decided according to the ratio of the reciprocal of the preprocessing estimation time but, alternatively, the processing ratio may be decided according to the ratio of the preprocessing estimation time so that the postprocessings of the respective jobs can be started almost at the same time.

D-10. In the second embodiment, the output processing amount to be measured by the output processing amount measure part 21 may be other than the output page number. For example, the number of recording sheets that have been output processed, the time of the output processing and the like can also be used as the output processing amount.

D-11. In the above-mentioned respective embodiments and modifications, when the parallel processing is executed, the preprocessings and postprocessings of a plurality of jobs are executed in parallel regardless of the functions. However, the jobs may be classified by the function and they may be processed in parallel for each function.

Figure 13:
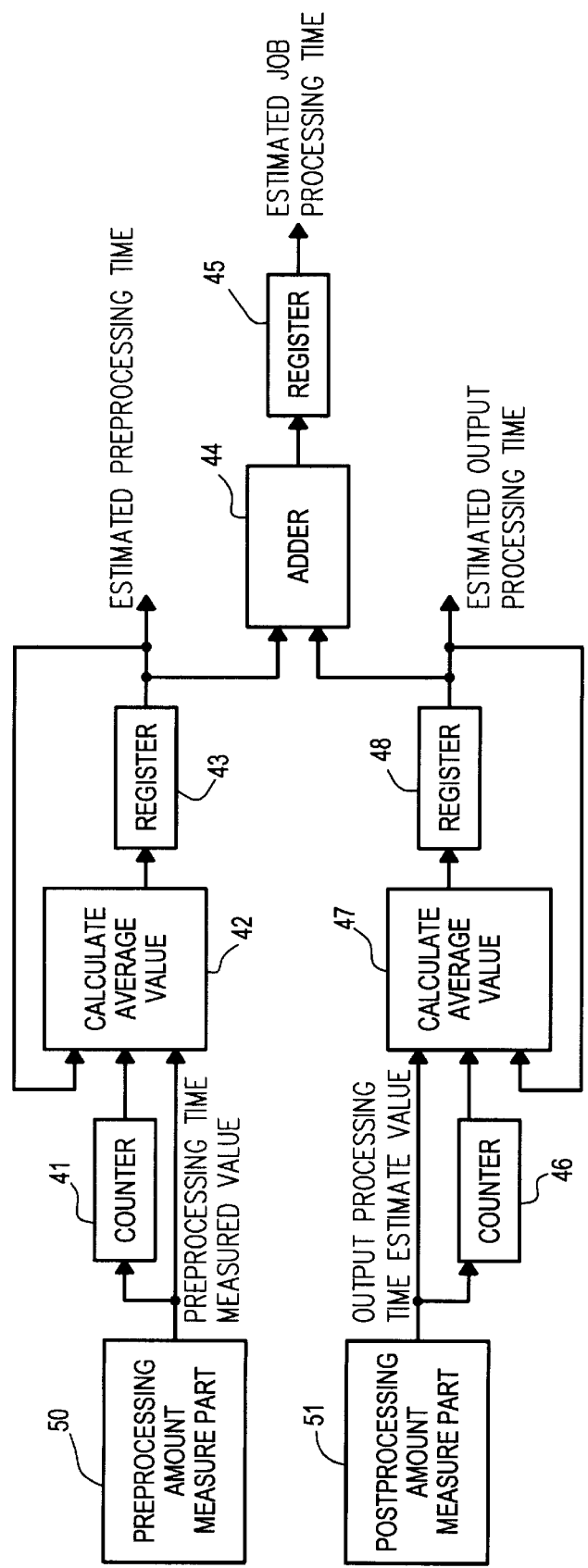
FIG. 13 is a block diagram of the main portions of a modification of the third embodiment.

D-12. The preprocessing amount estimate part 35 in the third embodiment may be modified as shown in FIG. 13. In the present modification, the processing time of an average job including a preprocessing and a postprocessing are calculated on the basis of the history of the actual preprocessing time and postprocessing thereof and the thus calculated processing time is considered as a preprocessing estimation time.

In FIG. 13, reference character 50 designates a preprocessing amount measure part which is structured similarly to the preprocessing amount measure part to measure the preprocessing times of the respective jobs. 41 stands for a counter which counts the number of jobs the preprocessing times of which have been measured. 43 designates a register which stores the average value of the preprocessing times therein. 42 stands for an average value calculate part which calculates the average value (preprocessing time $A_Q$) of the preprocessing times of jobs including the 1st job up to the Q-th job stored in the register 43, in accordance with the average value (preprocessing time $A_{Q-1}$) of the preprocessing times of the jobs including the 1st job up to Q-1-th job, the preprocessing time $t_{AQ}$ of the Q-th job, and the number of jobs Q.

That is, the average value calculate part 42 calculates the average preprocessing time $A_Q$ according to the following equation (1). The thus calculated average preprocessing time $A_Q$ is stored in the register 43. Here, the initial value of the preprocessing time $A_{Q-1}$ (when the job number Q=1) is 0.

$$A_Q = \{(Q-1)A_{Q-1} + T_{AQ}\}/Q \tag{1}$$

Also, 51 designates a postprocessing amount measure part which, similarly to the preprocessing amount measure part 50, measures the postprocessing times $t_{BQ}$ of the respective jobs. Also, a counter 46, an average value calculate part 47 and a register 48 are respectively structured similarly to the counter 41, average value calculate part 42 and register 43, while an average postprocessing time $B_Q$ is output from the register 48. Further, 44 stands for an adder which adds the average preprocessing time $A_Q$ to the average postprocessing time $B_Q$ and outputs the result thereof as an average processing time $T_Q$. The average processing time $T_Q$ is latched by a register 45.

The thus obtained average preprocessing time $A_Q$, average postprocessing time $B_Q$ and average processing time $T_Q$ are used as the estimate values of processing amounts in a job to be processed next in connection with the present function. That is, the processing ratios of the preprocessing and image forming processing by the function are decided in accordance with these values.

As has been described heretofore, according to the structure of the first aspect of the invention, since the processing amount recognize means recognizes processing amounts in the preprocessings of the respective jobs and the order decide means decides the order to execute the preprocessings or postprocessings of the respective jobs based on the respective processing amounts recognized by the processing amount recognize means, the order for execution of the preprocessings or postprocessings of the respective jobs can be decided automatically based on these preprocessing amounts of the jobs.

Also, according to the structure of the second aspect of the invention, due to the fact that processing amount recognize means recognizes the processings amounts of the preprocessings of the respective jobs and the processing ratio decide means decides a processing ratio for execution of the preprocessing or postprocessings of the respective jobs in accordance with the respective processing amounts recognized by the processing amount recognize means, ratios for execution of the preprocessings or postprocessings of the respective jobs can be decided automatically in accordance with the preprocessing amounts of the jobs.

Also, according to the structure of the third aspect of the invention, because the processing amount recognize means recognizes processing amounts in the postprocessings of the respective jobs and the order decide means decides the order to execute the preprocessings or postprocessings of the respective jobs based on the respective processing amounts recognized by the processing amount recognize means, the order to execute the preprocessings or postprocessings of the respective jobs can be decided automatically in accordance with the postprocessing amounts of the respective jobs.

Also, according to the structure of the fourth aspect of the invention, since the processing amount recognize means recognizes processing amounts in the postprocessings of the respective jobs and the processing ratio decide means decides processing ratios for execution of the preprocessings or postprocessings of the respective jobs based on the respective processing amounts recognized by the processing amount recognize means, ratios for execution of the preprocessings or postprocessings of the respective jobs can be decided automatically in accordance with the postprocessing amounts of the respective jobs.

Further, according to the structure of the fifth aspect of the invention, because the processing order or processing ratio is decided in accordance with the processing amounts of the central processing unit, it is possible to prevent the processing of the central processing unit from being collected on a given job or to prevent a possibility that a load exceeding the processing capacity of the central processing unit can be imposed on the central processing unit.

Still further, according to the structure of the sixth aspect of the invention, since the processing amount is recognized in accordance with the sizes of the data to be processed, there is eliminated need to measure the actual processing amount, which can reduce the size of the image processing device.

Yet further, according to the structure of the seventh aspect of the invention, as the order or ratios of processings can be decided by the function, such processings can be executed with improved efficiency.

Also, according to the structure of the eighth aspect of the invention, because a processing amount relating to a job to be generated next can be estimated in accordance with the already measured processing amount, there is eliminated the need to measure the processing amount in advance, thereby being able to reduce the size of the image processing device.

Further, according to the structure of the ninth aspect of the invention, due to the fact that a processing amount can be recognized in accordance with the size of a manuscript which can be measured simply and easily, there is eliminated the need to measure the actual processing amount, thereby being able to reduce the size of the image processing device.

Moreover, according to the structure of the tenth aspect of the invention, since the order decide means decides the processing order in such a manner that a job having a smaller processing amount recognized by the processing amount recognize means can be given priority in execution, a job having a smaller processing amount can be processed in preference to other jobs.

In addition, according to the structure of the eleventh aspect of the invention, because the processing ratio decide means gives a higher processing ratio to a job having a smaller processing amount recognized by the processing amount recognize means, a job having a smaller processing amount can be processed in preference to other jobs.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing device, comprising:
   process means for executing a plurality of jobs each consisting of a given preprocessing and a postprocessing to be executed after execution of said preprocessing;
   processing amount recognize means for recognizing processing amounts in said preprocessings of said respective jobs; and
   order decide means, in accordance with said respective processing amounts recognized, for deciding the order to execute said preprocessings or said postprocessings of said jobs;
   wherein an output processing priority of a job having a long preprocessing time is not lowered further after the job has been delayed a predetermined length of time.

2. An image processing device, comprising:
   process means for executing a plurality of jobs each consisting of a given preprocessing and a postprocessing to be executed after execution of said preprocessing;
   processing amount recognize means for recognizing processing amounts in said preprocessings of said respective jobs;
   processing ratio decide means, in accordance with said respective processing amounts recognized, for deciding the processing ratios of said preprocessings or said postprocessings of said respective jobs; and
   parallel execute means, in accordance with said processing ratios, for executing said preprocessings or said postprocessings in parallel;
   wherein an output processing priority of a job having a long preprocessing time is not lowered further after the job has been delayed a predetermined length of time.

3. An image processing device, comprising:
   process means for executing a plurality of jobs each consisting of a given preprocessing and a postprocessing to be executed after execution of said preprocessing;
   processing amount recognize means for recognizing processing amounts in said postprocessings of said respective jobs; and
   order decide means, in accordance with said processing amounts recognized, for deciding the order to execute said preprocessings or said postprocessings of said respective jobs;
   wherein an output processing priority of a job having a long preprocessing time is not lowered further after the job has been delayed a predetermined length of time.

4. An image processing device, comprising:
   process means for executing a plurality of jobs each consisting of a given preprocessing and a postprocessing to be executed after execution of said preprocessing;
   processing amount recognize means for recognizing processing amounts in said postprocessings of said respective jobs;
   processing ratio decide means, in accordance with said respective processing amounts recognized, for deciding the processing ratios of said preprocessings or said postprocessings of said respective jobs; and
   parallel execute means, in accordance with said processing ratios, for executing said preprocessings or said postprocessings in parallel;
   wherein an output processing priority of a job having a long preprocessing time is not lowered further after the job has been delayed a predetermined length of time.

5. An image processing device as set forth in claim 1, further comprising a central processing unit for executing or controlling said preprocessings or said postprocessings, wherein said processing amounts are the processing amounts of said central processing unit.

6. An image processing device as set forth in claim 1, wherein said processing amount recognize means recognizes said processing amounts based on the sizes of the data to be processed on said respective jobs.

7. An image processing device as set forth in claim 1, further comprising functional classify means for classifying said jobs according to functions to be processed, wherein said processing amount recognize means estimates said processing amounts according to the jobs classified by said functional classify means.

8. An image processing device as set forth in claim 1, further comprising processing amount measure means for measuring the processing amounts of said preprocessings or said postprocessings of said respective jobs, wherein said processing amount recognize means, in accordance with said processing amounts measured by said processing amount measure means, estimates a processing amount relating to a job to be generated later.

9. An image processing device as set forth in claim 1, wherein said jobs are jobs for copying a manuscript, and also wherein said processing amount recognize means detects the size of said manuscript before the contents of said manuscript are read out and, based on the detected result, recognizes said processing amounts.

10. An image processing device as set forth in claim 1, wherein said order decide means decides said order in such a manner that a job having a smaller processing amount recognized by said processing amount recognize means can be executed in preference to other jobs.

11. An image processing device as set forth in claim 2, wherein said processing ratio decide means gives a higher processing ratio to a job having a smaller processing amount recognized by said processing amount recognize means.

12. An image processing device as set forth in claim 1, wherein said postprocessings are image forming processings.

13. An image processing method, comprising the following steps and executing them in the following order:
- a first step of executing the preprocessings of a plurality of jobs received;
- a second step of recognizing the processing amounts of said preprocessings executed by said first step every job;
- a third step of deciding the order to execute the postprocessings of said respective jobs in accordance with said respective processing amounts recognized by said second step; and
- a fourth step of executing said postprocessings of said respective jobs on said order decided by said third step;
- wherein an output processing priority of a job having a long preprocessing time is not lowered further after the job has been delayed a predetermined length of time.

14. An image processing method, comprising the following steps and executing them in the following order:
- a first step of executing the preprocessings of a plurality of jobs received;
- a second step of recognizing the processing amounts of said preprocessings executed by said first step every job;
- a third step of deciding the processing ratios of the postprocessings of said respective jobs in accordance with said respective processing amounts recognized by said second step; and
- a fourth step of executing said postprocessings of said respective jobs in parallel at said processing ratios decided by said third step;
- wherein an output processing priority of a job having a long preprocessing time is not lowered further after the job has been delayed a predetermined length of time.

15. An image processing method as set forth in claim 13, wherein said second step recognizes said processing amounts in accordance with the sizes of the data to be processed on said respective jobs.

16. An image processing method as set forth in claim 13, wherein said jobs are jobs for copying a manuscript, and wherein said second step detects the size of said manuscript before the contents of said manuscript are read out and, based on the detected result, recognizes said processing amounts.

17. An image processing method as set forth in claim 13, wherein said third step decides said order in such a manner that a job having a smaller processing amount recognized by said second step can be executed in preference to other jobs.

18. An image processing method as set forth in claim 14, wherein said third step decides said processing ratios in such a manner that a higher processing ratio can be given to a job having a smaller processing amount recognized by said second step.

19. An image processing device as set forth in claim 1, further including a storage means, wherein said postprocessings are initiated by retrieval of data from the storage means.

* * * * *